July 26, 1949.　　　　S. A. SCHERBATSKOY　　　　2,477,145
NAVIGATIONAL METHOD AND APPARATUS
Filed Feb. 22, 1945　　　　　　　　　　　　　　5 Sheets-Sheet 1
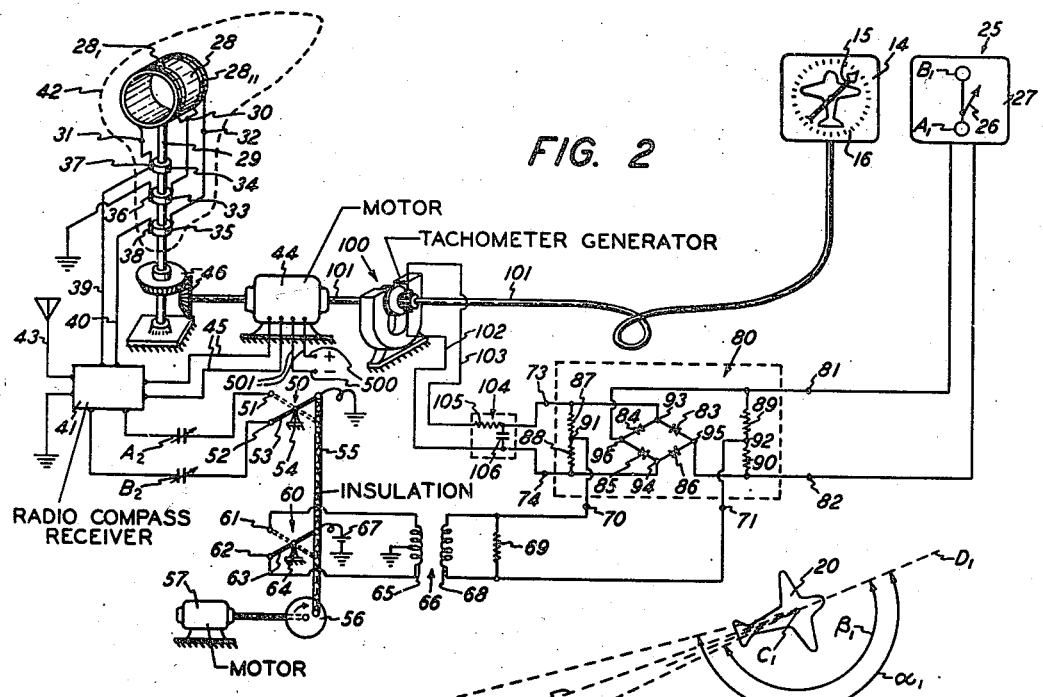
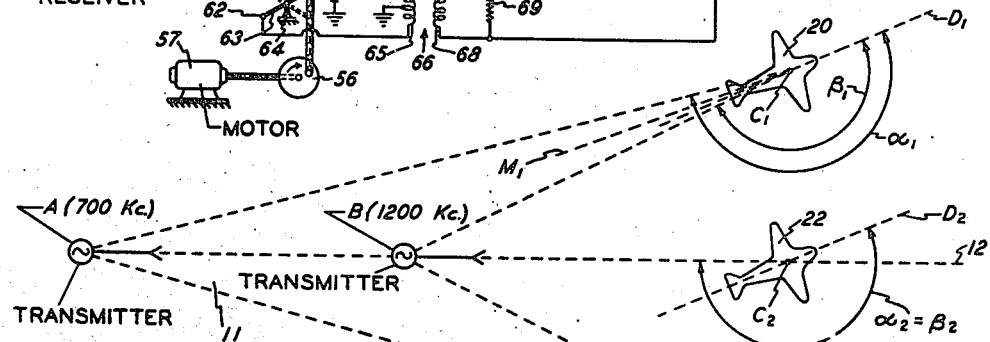
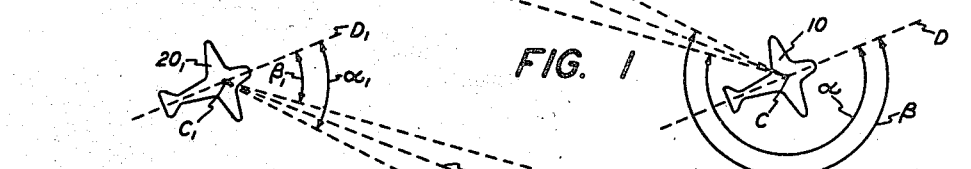
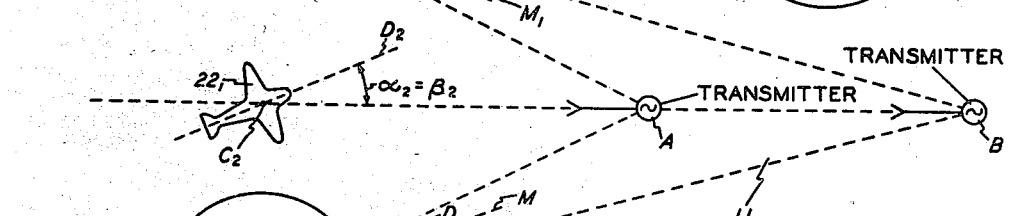
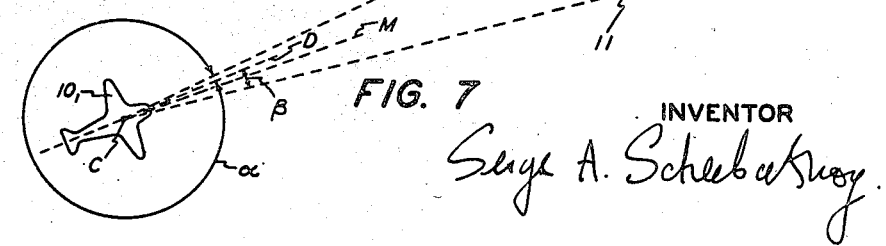
INVENTOR
Serge A. Scherbatskoy.

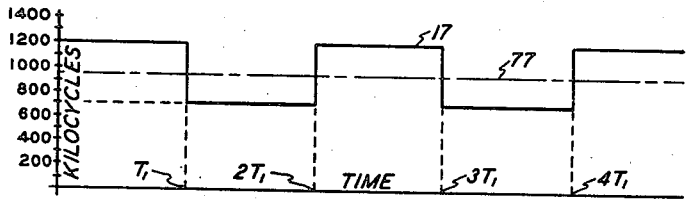
FIG. 3a
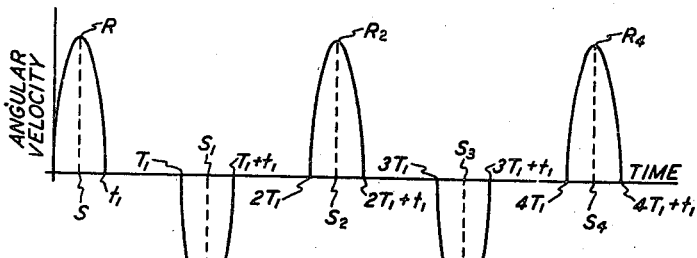
FIG. 3b
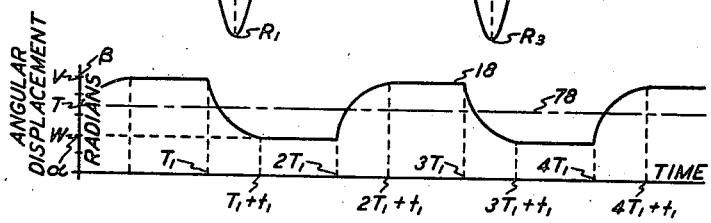
FIG. 3c
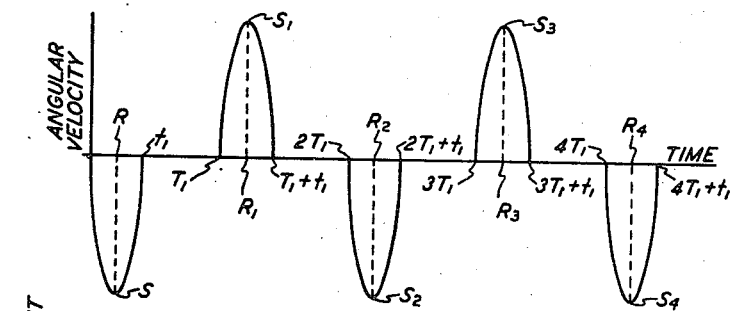
FIG. 3d
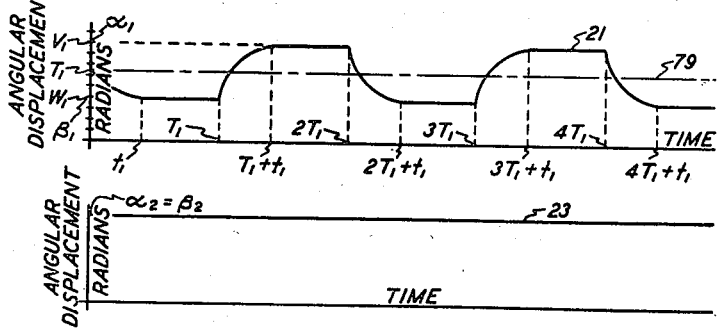
FIG. 3e
FIG. 3f
INVENTOR
Serge A. Scherbatskoy

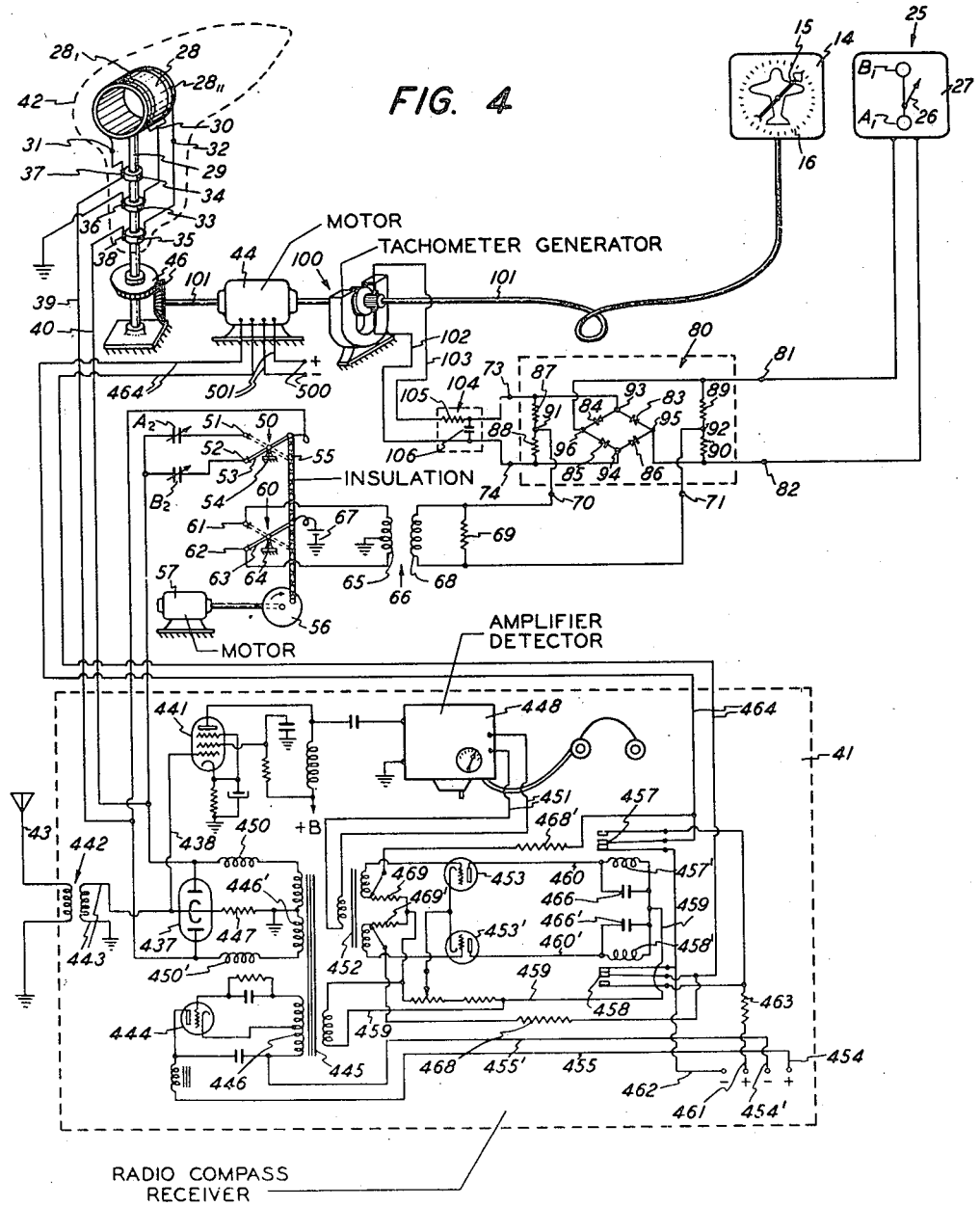

July 26, 1949.  S. A. SCHERBATSKOY  2,477,145
NAVIGATIONAL METHOD AND APPARATUS
Filed Feb. 22, 1945  5 Sheets-Sheet 4
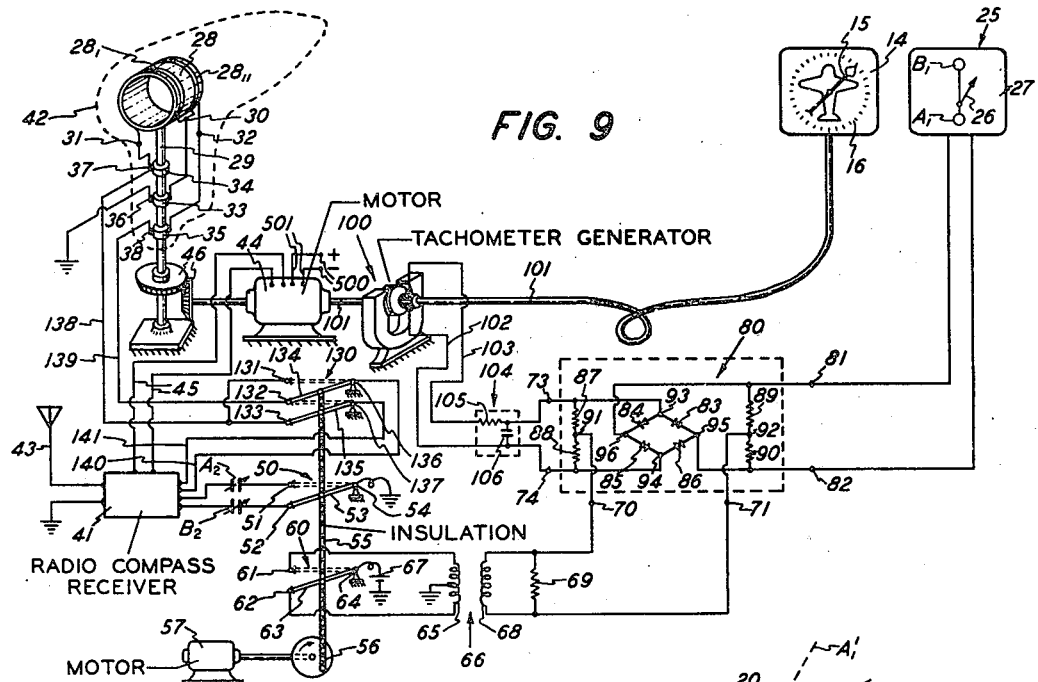
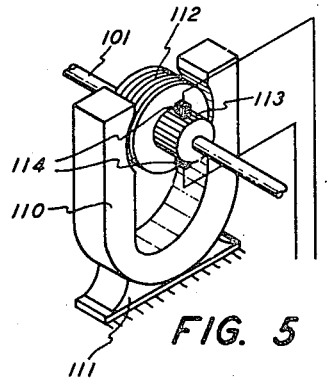
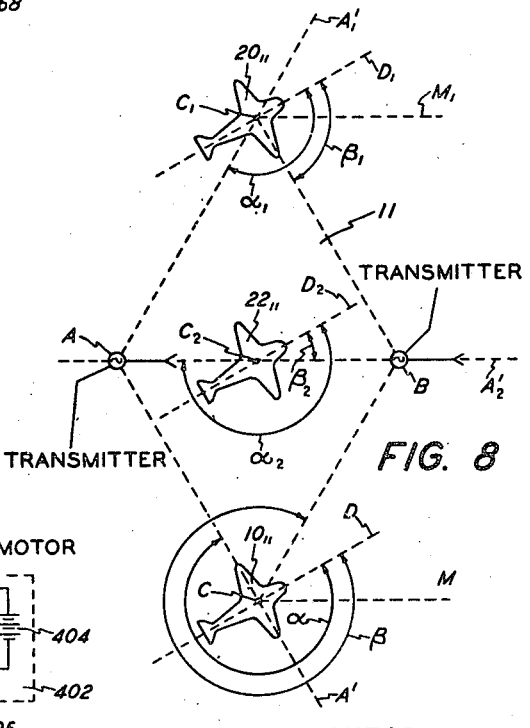
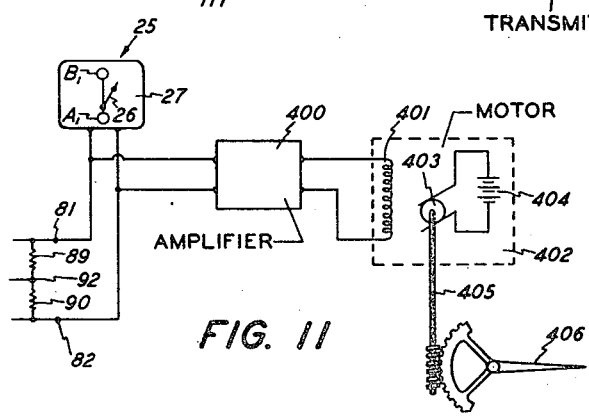
INVENTOR
Serge A. Scherbatskoy.

INVENTOR
Serge A. Scherbatskoy.

Patented July 26, 1949

2,477,145

UNITED STATES PATENT OFFICE 2,477,145

NAVIGATIONAL METHOD AND APPARATUS

Serge A. Scherbatskoy, Tulsa, Okla.

Application February 22, 1945, Serial No. 579,225

14 Claims. (Cl. 343—117)

My invention relates, in general, to radio systems of navigation, and, more particularly, to a system embodying an arrangement of two radio transmitting stations and radio direction finding apparatus carried by a movable craft, the apparatus and two stations being used to indicate the position of the craft relative to the vertical plane passing through the locations of the two transmitting stations. This application is a continuation-in-part of applicant's copending application Serial Number 465,443, filed November 13, 1942, now abandoned.

My invention deals particularly with a radio locating system for aircraft and other moving craft such as ships, etc., and has for one of its objects the provision of an improved method and apparatus for indicating the position of a craft with respect to a reference line fixed in space. The information supplied to the navigator by virtue of the present invention is somewhat similar to the information supplied by means of the well known radio beam navigating system, but the present system has a distinct advantage over the radio beam system in that no special radio transmitters are required on the ground. Any two ordinary radio transmitters such as broadcasting transmitters can be used to provide the navigator with the equivalent of a beam or reference line fixed in space along which he can navigate by radio without any tendency to drift caused by side winds. This invention also obviates the disadvantages of other well known methods of navigation in which the position of the longitudinal axis of the airplane is indicated instead of the line of flight. It is well known that the longitudinal axis of an airplane does not necessarily coincide with the line of flight.

It is another object of my invention to provide an improved method and improved apparatus for accomplishing the above ends. The essence of my navigation method resides in guiding the craft on the desired path by means of two direction finding operations performed automatically on board the craft to ascertain the directions of two stations located on the path.

Various attempts have in the past been made to provide navigational means for guiding a craft along a trajectory having a definite geometrical relationship relative to ground transmitters suitably distant one from the other. One such attempt is described by Koster in his U. S. Patent 2,158,584, issued on May 16, 1939. A particular feature of Koster's method consists in using two specially designed ground transmitters having different radiating powers and making the receiver response depend upon the relative radiating powers of the two transmitters. Another feature of the Koster method consists in providing a signal showing whether or not the craft has its longitudinal axis properly oriented relative to a trajectory which may eventually restore the position of the craft on the selected trajectory. It is apparent that the Koster method is not related to the problem solved by the present invention since it is not adapted to operate in conjunction with any selected pair of ground transmitters and, furthermore, is not adapted to produce a positional indication of the craft which is not affected by the orientation of the longitudinal axis of the craft.

It is, therefore, a further object of my invention to produce an indication of the position of a craft relative to a line positioned in a definite geometrical relationship with respect to any selected pair of radio transmitting stations by providing improved receiving means the output of which is changed in response to movement of the craft from a position one one side of the line to a position on the other side of the line.

It is still another object of my invention to produce an indication of the position of the craft relative to a line positioned in a definite geometrical relationship with respect to any selected pair of radio transmitting stations having different output frequencies by providing facilities for periodically varying the tuning of the receiving means for the alternate reception of signals radiated from the two transmitting stations, whereby the output of the receiving means is varied in a predetermined manner depending upon the position of the craft relative to the line.

It is another and more general object of my invention to produce an indication of the relative intensities of two distinguishable signals spacially distributed in the same portion of a medium by providing improved receiving means arranged for the alternate and recurrent reception of the signals, and by comparing the output of the receiving means with a selected reference variation.

It is a further object of my invention to provide improved methods and apparatus for automatic straight line navigation between any two radio transmitting stations, and in either direction along the prolongation of the straight line connecting the two stations.

It is a further object of my invention to provide an improved arrangement for automatically steering the craft along a trajectory fixed in space.

Further objects and advantages of my invention will become apparent from the following specification, taken in connection with the accompanying drawing, in which:

Fig. 1 shows diagrammatically a portion of the territory with two spaced fixed radio transmitting stations, and illustrates three airplanes occupying various positions with respect to a line passing through the said transmitting stations. In the arrangement shown the airplanes are located on one side of the transmitting stations, and are moving away from said stations.

Fig. 2 illustrates the application of the principles of my invention to a direction finder commonly designated as the direction finder of the self-orienting type.

Fig. 3a illustrates diagrammatically the switching sequence for tuning the direction finder from one station to another.

Fig. 3b shows diagrammatically the angular velocity of the indicating pointer of the direction finder when the craft is located on one side of the selected trajectory.

Fig. 3c shows diagrammatically the angular displacements of the indicating point that correspond to the conditions of Fig. 3b.

Fig. 3d shows diagrammatically the angular velocity of the indicating pointer when the craft is located on the opposite side of the selected trajectory.

Fig. 3e shows diagrammatically the angular displacements of the indicating pointer that correspond to the conditions of Fig. 3d.

Fig. 3f shows the position of the pointer when the craft is located on the selected trajectory.

Fig. 4 gives a more detailed illustration of the instrument shown in Fig. 2.

Fig. 5 shows diagrammatically the tachometer generator that constitutes one of the elements of Fig. 2 and of Fig. 9.

Figure 6:
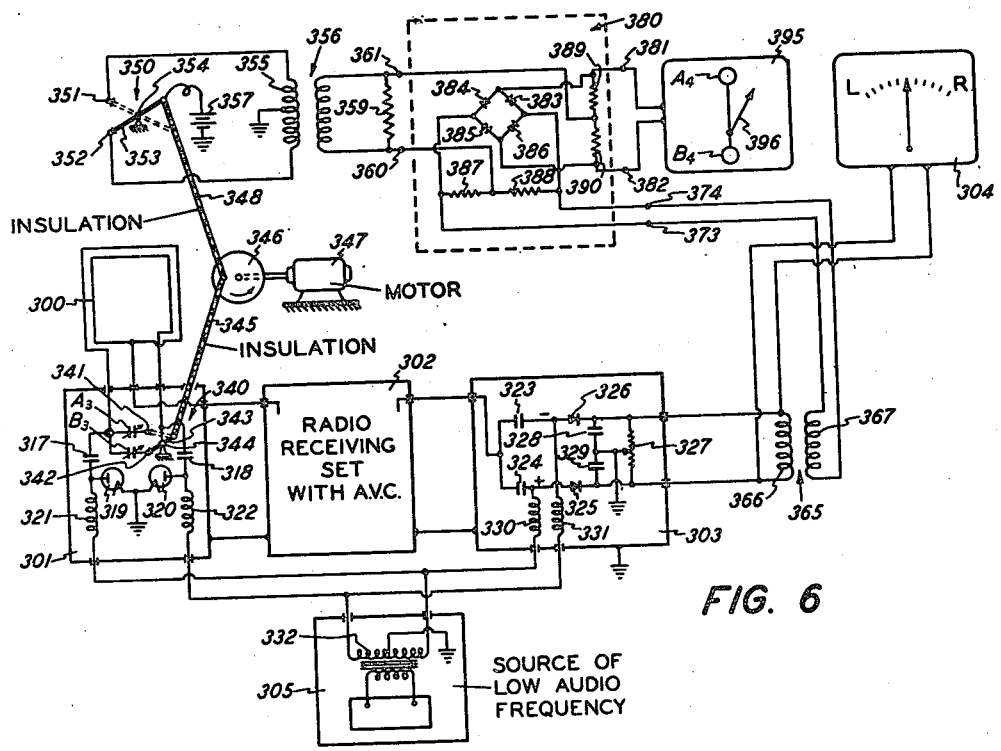

Fig. 6 illustrates the application of the principles of my invention to a direction finder commonly designated as the direction finder of the homing type.

Fig. 7 shows an arrangement similar to the one shown in Fig. 1 but in which the airplanes shown therein are located on one side of the transmitting stations and are moving towards said station.

Fig. 8 shows an arrangement similar to the one of Fig. 1, but in which the airplanes shown therein are located between the two transmitting stations.

Fig. 9 shows certain modifications that are required in the direction finder of the type shown in Fig. 2, in order to make said direction finder adapted to navigate under the conditions of Fig. 8.

Figure 10:
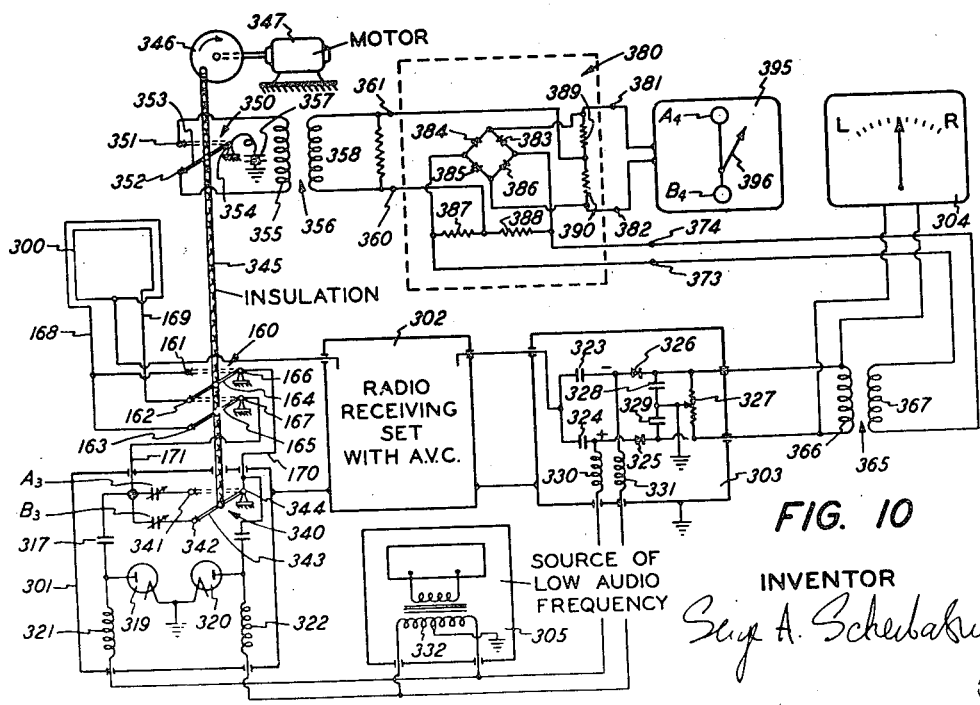

Fig. 10 shows certain modifications that are required in the direction finder of the type shown in Fig. 6 in order to make said direction finder adapted to navigate under the conditions of Fig. 8.

Fig. 11 shows an arrangement for automatically steering the craft in alignment with a trajectory fixed in space.

In carrying out my invention use is made of conventional radio compasses, either of the left-right indicator (homing) type or of the station seeking rotatable loop automatic direction finder (ADF) type, which usually are equipped with manual means for drift compensation, but do not provide directly an effective means for straight line navigation. Conventional radio-compasses are essentially devices for determining the angular orientation of the axis of the ship and are not instruments which readily provide information regarding the position of the ship with respect to landmarks. Because the ship may be forced off course by cross-winds and other effects, it is of importance to be able to bring the ship itself back to a position in space that is on the desired course and not merely to orient the ship so that its longitudinal axis is pointed in the direction of the desired destination. The only widely used automatic system of radio navigation which provides the latter form of navigational aid is the U. S. Department of Commerce radio range beam system.

In accordance with my invention a new radio-compass is provided which enables navigation along a straight line, similar to that provided by the Department of Commerce radio range beams, but by use of ordinary radio transmitters such as continuous wave or broadcasting transmitters. By means of my improved radio-compass, therefore, navigation along a narrow, well defined straight path or air "highway" is realized; the position of this navigational path being determined entirely by the ordinary radio transmitters. Instrumentally, the present improved compass comprises a novel combination of a single conventional radio-compass with certain novel control circuits. The indicating device is identical to that used in conjunction with radio range beams, i. e., either earphones (a and n signal) or an indicating meter.

In order to provide the proper definition of the navigation path, it is necessary that two ordinary radio transmitters be available which are located along the navigation path which it is desired to fly. In a simple case, for example, if it should be desired to fly along a straight path from New Orleans to Galapagos Islands, it is necessary that two ordinary radio transmitters be available on, or on the extension of, the line joining New Orleans and Galapagos Islands.

In combining the present improved facilities with a radio direction finder of the "homing" type, it is necessary to provide the direction finder with dual tuning elements and a switching mechanism for alternately rendering the tuning elements effective to determine the signal translated by the direction finder. The automatic switching mechanism is so arranged that this change-over is accomplished cyclically about once per second. In the example given about where it is desired to fly from New Orleans to Galapagos Islands, the navigator merely has to adjust the first tuning element for the reception of a signal radiated by a radio transmitting station at New Orleans and the second tuning element for the reception of a signal radiated by a radio transmitting station somewhere on the straight line passing through New Orleans and Galapagos Islands or on the extension thereof; for example, a transmitting station located at Chicago, Illinois, which is on the northward extension of this straight line, assuming that Galapagos Islands do not have a radio transmitter or are out of range of radio reception. Apart from the cyclic switching operation, the direction finder will operate normally so long as the aircraft is flying along the straight line joining New Orleans to Galapagos Islands, and the indicated directions of the two radio stations, New Orleans and Chicago, will be exactly zero degrees apart. Thus in the case of no cross-wind, New Orleans and Chicago will be directly astern of the ship. This angular difference will, however, be exactly 0 degrees only when the ship is located on the straight line in question, and as the ship's position deviates to one side or the other of this straight line, the angle between the two directional indications will be either greater than 0 degrees (positive) or smaller than 0 degrees (negative). The present improved radio compass includes means for automatically measuring this angle and for indicating on a dial before the pilot when the aircraft is "on course" (angle 0°) "left of course" (angle negative) or "right of course" (angle positive).

The present improved radio compass further includes means for insuring straight line navigation when the airport to which it is desired to navigate has a radio transmitter that is not out of range of radio reception. In the case given above, it is merely necessary to tune the two control elements of the radio-compass for the reception of signals radiated from New Orleans and Galapagos Islands. In this example, the ship will be located on the desired straight line path so long as the difference between the angular indication corresponding to Galapagos Islands and the angular indication corresponding to New Orleans is 180°. When the angular difference between these two indications is greater than 180°, the aircraft is on one side of the desired navigational line and when the angular difference is smaller than 180°, the aircraft is located on the other side of the line.

Similarly, by using two remote radio transmitters that line on the line along which navigation is desired, navigation along a straight line can be obtained when the point of departure does not have a transmitter. Thus, the reference angle is 180 degrees when navigating between two radio transmitters, and zero degrees when navigation is accomplished by using a pair of radio transmitters ahead or astern of the ship. Suitable switching means are provided for switching from a reference angle of 180 degrees to a reference angle of zero degrees.

Referring now to Fig. 1 of the drawings, a navigational problem is there graphically illustrated in which the aircraft designated by the numeral 10 is flying above a territory 11. It may be assumed that the navigator of the aircraft is desirous of flying along a path designated by the line 12 on which are located two geographically separated radio transmitting stations A and B. These radio transmitters do not have to be special radio transmitters built for aerial navigation purposes, but may be any selected pair of ordinary broadcasting stations having widely separated carrier frequencies. Thus, the transmitters A and B may be arranged to transmit non-directionally radio waves at frequencies $f_1$ and $f_2$, respectively, and are disposed on a line 12 designating the trajectory of the flight. The radio navigation system which is the subject of the present invention is located in the craft 10 and is provided with a radio direction finder which indicates to the navigator whether the craft follows a straight line along the trajectory 12 or whether it has deviated from this trajectory, and in case of deviation, what operations are necessary to reestablish the position of the craft on the trajectory 12. In order to achieve the above purpose the direction finder is provided among other things with two tuning elements, a receiving circuit and an indicator. Under normal operating conditions when it is desired to guide the craft along the trajectory 12, the navigator adjusts the tuning elements so that an automatic switching mechanism successively and repeatedly tunes the direction finder to frequencies $f_1$ and $f_2$, respectively. This operation is performed by means of a suitable change-over device which changes alternately and in rapid succession the tuning of the receiver circuit between the wave lengths of the transmitting stations A and B. The output of the apparatus controls an indicator which informs the navigator whether the craft is in alignment with the trajectory 12 and in case of a deviation from the said alignment which is the position of the craft with respect to the trajectory 12.

In carrying out this invention radio direction finders of various forms may be employed. I have, however, chosen as preferred embodiments two types of direction finders. One type is commonly known as the self-orienting direction finder and is shown diagrammatically in Fig. 2 and in Fig. 9. The other type known as the homing direction finder is shown in Fig. 6 and in Fig. 10.

The direction finder illustrated in Fig. 2 is provided with an indicator 14 in which an azimuth indicating pointer 15 is adapted to rotate on a fixed scale 16. The position of the pointer 15 indicates at any instant the bearing of the station being received with respect to the longitudinal axis of the aircraft. Thus, for instance, if the aircraft is assumed to be located at a position indicated by the numeral 10 in Fig. 1, and if the direction finder is tuned to the station A, then the indicating pointer 15 will show an angle $\alpha$, said angle $\alpha$ being indicated in Fig. 1 as the angle between the longitudinal axis CD of the craft and the direction CA of the transmitter A. When, however, the direction finder is tuned to the station B, then the indicating pointer 15 will show an angle $\beta$, said angle $\beta$ being indicated in Fig. 1 as the angle between the longitudinal axis CD of the craft and the direction CB of the transmitter B.

Let the frequency $f_1$ of the transmitting station A be 700 kc., the frequency of the transmitting station B be 1200 kc. and let the direction finder be switched from the station A to the station B at a certain definite frequency which may be several times per second or any other suitable frequency.

Consider now Fig. 3a which represents a diagram in which the axis of abscissas is the time axis and the axis of ordinates represents the frequency of the stations being tuned to. Then the periodic switching process can be represented by a "square-wave" line 17 which represents the variation of the frequency to which the direction finder is tuned with respect to time. As shown in the diagram, the line 17 represents periodic and sudden variations from the frequency of the station A (700 kc.) to the frequency of the station B (1200 kc.). Let the time period corresponding to this switching process be $2T_1$.

In the study of the graph shown in Fig. 3a we find it particularly desirable to shift the time axis upwards in such a manner that the new time axis occupies a mean position between the ordinates representing the extreme values of 1200 kc. and 650 kc. This new time axis is represented in Fig. 3a by the line 77.

It is apparent that the indication of the pointer 15 will change when the direction finder is tuned to a different station and, consequently, the pointer 15 will oscillate back and forth between two positions: the position indicating the angle $\beta$, corresponding to station B (1200 kc. in the diagram of Fig. 3a) and the position indicating the angle $\alpha$, corresponding to station A (700 kc. in the diagram of Fig. 3a). The frequency of these oscillations will be the same as that of the periodic switching process and the mean position that the pointer 15 will occupy during the oscillatory process represents the orientation CM shown in Fig. 1.

Consider now Fig. 3b, which represents a diagram in which the axis of abscissas is the time axis and the axis of ordinates represents the angular velocity of the pointer 15 during the oscillatory motion described above. Let the angular velocity be considered as positive when the pointer 15 turns clockwise and let the velocity be negative when it turns anticlockwise. Assume that prior to an initial moment $t=0$, the direction finder was tuned to the station A, and, consequently, the direction of the pointer 15 was represented by the line CA. Assume also that at the instant $t=0$ the tuning of the direction finder suddenly changes from 750 kc. to 1200 kc. and that the direction finder is made to be suddenly responsive to the waves derived from the station B. Then from the inspection of Fig. 1 it becomes apparent that the pointer 15 leaves the orientation CA and performs an angular displacement in the clockwise (positive) direction in order to assume an orientation represented by the line CB. Let $t_1$ represent the time interval from the initial instant until the instant at which the pointer reached the orientation CB. It is apparent from Fig. 3b that at $t=0$ the angular velocity of the pointer was zero, since the pointer was stationary and that at later instants the angular velocity assume positive values since the pointer moved in the clockwise direction. The variation of the angular velocity of the pointer with respect to time is represented by a line which increased in absolute magnitude in the positive direction until it reached a maximum value RS, then decreased in absolute magnitude, returned to the value zero at time $t=t_1$ when the pointer reached the orientation CB, and remained at the value zero as long as the direction finder remained tuned to the station B.

Let at $t=T_1$ the tuning of the direction finder be suddenly switched from the station B to the station A. Then from the inspection of Fig. 1 it becomes apparent that the pointer 15 leaves the orientation CB and performs an angular displacement in the anticlockwise (negative) direction in order to assume an orientation represented by the line CA. It is apparent from Fig. 3b that at $t=T_1$ the angular velocity of the pointer 15 began to increase from the value zero towards negative values since the pointer moved in the anticlockwise direction. The variation of the angular velocity of the pointer with respect to time is represented by a line which increased in absolute magnitude in the negative direction until it reached a maximum value $R_1S_1=RS$, then decreased in absolute magnitude, returned to the value zero at time $t=T_1+t_1$ when the pointer reached the orientation CA and remained at the value zero as long as the direction finder remained tuned to the station A.

Let again at $t=2T_1$ the tuning of the direction finder be suddenly switched from the station A to the station B. Then the pointer 15 performs an angular displacement in the positive direction in order to assume the orientation of the line CB. It is also apparent that at $t=2T_1$ the angular velocity of the pointer begins to increase from the value zero towards positive values until it reaches a magnitude $R_2S_2=RS$, then decreases in absolute magnitude, returns to the value zero at time $2T_1+t_1$ when the pointer reaches the orientation CB and remains at the value zero as long as the direction finder remains tuned to the station B.

It is now apparent that when at the subsequent instants $t=3T$, or $t=4T$, or $t=5T$, etc. the tuning of the direction finder is suddenly switched from one station to another, the corresponding velocity of the pointer 15 rises from value zero to a positive maximum or to a negative maximum. Then, after a time interval $t_1$, it reaches the value zero and remains at zero until the next half period recommences. The periodic variations in the angular velocity of the pointer 15 are shown in Fig. 3b.

Consider now Fig. 3c which represents not the angular velocities but the angular displacements of the pointer 15 during the switching process. The axis of abscissas in Fig. 3c is the time axis and the axis of ordinates represents the angular position of the pointer 15. As shown in the diagram, the line 18 represents the periodic variations from the angle $\alpha$ corresponding to the tuning of the station A and the angle $\beta$ corresponding to the tuning of the station B.

It is apparent that the graph shown in Fig. 3c (representing the variation of the angular displacement with respect to time) is actually a time integral of the function shown in Fig. 3b (representing the velocity variation) plus a constant of integration. In the study of the Fig. 3c we find it particularly desirable to select such an integration constant, that would enable to shift the time axis in such a manner that the new time axis occupies a mean position between the ordinates representing the values $\beta$ and $\alpha$. This new time axis is represented in Fig. 3c by the line 78. It is apparent that the line 78 corresponds actually to the mean orientation CM of the pointer 15 during the above described oscillatory process.

Consider, therefore, the angular displacements of the pointer 15 as referred to new time axis identified by the numeral 78. It is apparent that the line 18 represents the oscillatory motion of the pointer 15 with reference to the orientation CM. Any angular displacement in a clockwise direction with respect to CM is represented by a positive value and any angular displacement in the anticlockwise direction with respect to CM is represented by a negative value. The motion illustrated in Fig. 3c is characterized by two extreme values of the angular displacement, one of said values being represented by the length TW corresponding to the angle MCA and the other value being represented by the length TV corresponding to the angle MCB.

Consider now an aircraft which occupies the position 20 rather than the position 10, i. e., the aircraft is located on the other side of the trajectory 12 as shown in Fig. 1. Then, when the direction finder is alternately and recurrently tuned to the stations A and B as shown diagrammatically in Fig. 3a, the corresponding angular velocities of the pointer 15 will vary in a manner shown in Fig. 3d. Then the angular displacements of the pointer 15 will vary with respect to time in a manner designated by the line 21 in Fig. 3e. It is apparent that the function represented by the line 21 is equal to the time integral of the function shown in Fig. 3d, plus an integration constant. By referring now to Fig. 1 it is seen that when the direction finder is tuned to the station A, the indicating needle 15 will shown an angle $\alpha_1$, the said angle being indicated in Fig. 1 as an angle between the longitudinal axis of the plane $C_1D_1$ and the direction $C_1A$ of the transmitter A. Under such conditions, when the direction finder is being switched alternately and repeatedly from the station A to the station B the pointer will oscillate between two positions, one of the said positions corresponding to the tuning of the station A and indicating the angle $\alpha_1$: the other position corresponding to the tuning of the station B and indicating the angle $\beta_1$. The mean position that the pointer will occupy during this oscillatory process represents the orientation $C_1M_1$.

In the study of Fig. 3e we find it particularly desirable to shift the time axis upwards in such a manner that the new time axis occupies a mean position between the ordinates representing the values $\alpha_1$ and $\beta_1$. This new time axis is represented in Fig. 3e by the line 79. It is apparent that the line 79 corresponds actually to the mean orientation $C_1M_1$ of the pointer 15 that corresponds to the position 20 of the craft. It is apparent that any angular displacement in a clockwise direction with respect to $C_1M_1$ is represented by a positive value and any angular displacement in the anticlockwise direction with respect to $C_1M_1$ is represented by a negative value when considered with reference to the new time axis 79. The motion illustrated in Fig. 3e is characterized by two extreme values of the angular displacement, one of said values being represented by the length $T_1V_1$ corresponding to the angle $M_1C_1A$, and the other value being represented by the length $T_1W_1$ corresponding to the angle $M_1C_1B$.

Consider now an airplane which occupies the position 22, i. e., the airplane is located on the trajectory 12. Then when the direction finder is tuned to the station A the pointer 15 will show an angle $\alpha_2$, the said angle being indicated in Fig. 1 as an angle between the longitudinal axis $C_2D_2$ of the craft and the direction $C_2A$ of the transmitter A. When the direction finder is tuned to the station B, then the pointer 15 will indicate the angle $\beta_2$, the said angle $\beta_2$ being indicated in Fig. 1 as an angle between the longitudinal axis $C_2D_2$ of the craft and the direction $C_2B$ of the transmitter B. It is apparent that the direction $C_2B$ coincides with the direction $C_2A$ and, consequently, $\alpha_2=\beta_2$. Therefore, when the direction finder is being switched alternately and repeatedly from the station A to B the pointer 15 will be stationary and will occupy a position corresponding to the angle $\alpha_2=\beta_2$. Consequently, there will be no oscillation of the pointer 15 and its position is represented diagrammatically in Fig. 3f by a horizontal line 23. In this figure the abscissas correspond to time and the ordinates correspond to the angular position of the needle 15.

Consider now the three curves 17, 18 and 21 shown in Figs. 3a, 3c and 3e, respectively, and compare the variation or ordinates with respect to the same values of abscissa. It is seen that $\beta>\alpha$ and $\beta_1<\alpha_1$. It is also seen that when the ordinates of the curve 18 are larger and correspond to the angle $\beta$, the ordinates of the curve 21 are smaller and correspond to the angle $\beta_1$. On the other hand, at times when the ordinates of the curve 18 are smaller and correspond to the angle $\alpha$, the ordinates of the curve 21 are larger and correspond to the angle $\alpha_1$. It is also seen that when the curve 17 has increased ordinates, the curve 18 has increased ordinates, i. e., when the curve 17 indicates the value 1200, the curve 18 indicates the value $\beta$. When the curve 18 has decreased ordinates, the curve 17 has decreased ordinates also; i. e., when the curve 17 indicates the value 700, the curve 18 indicates the value $\alpha$.

Consequently, the variation of the curve 18 can be defined as "in phase" with the variation of curve 17, since the curve 18 increases and decreases substantially at the same time when curve 17 makes corresponding increases and decreases.

By comparing the curves 17 and 21 it is also seen that when the curve 17 has increased ordinates, the curve 21 has decreased ordinates; i. e., when the curve 17 indicates the value 1200, the curve 21 indicates the value $\beta_1$. When the curve 17 has decreased ordinates, the curve 21 has increased ordinates, i. e., when the curve 17 indicates the value 700, the curve 21 indicates the value $\alpha_1$. Consequently, the curve 21 can be defined as "out of phase" with the curve 17 because the curve 21 increases when curve 17 decreases and vice versa.

Although the term phase usually is used in connection with sinusoidal functions it is convenient here to use the term phase in connection with the non-sinusoidal functions. The term "phase" in this particular case may be applied to the phase relationship existing between the fundamental frequency of the curves 17, 18 or of the curves 17, 21.

The comparison of the curves 17, 18 and 21 can also be made by referring these curves to the new time axis that are represented by the lines 77, 78 and 79, respectively. Then, the graph 17 represents a quantity that assumes alternately and repeatedly positive and negative values. The value represented by the graph 18 varies in synchronism and in phase with the value represented by the graph 17; i. e., both values are simultaneously positive and negative. On the other hand, the value represented by the graph 19 varies in synchronism but in phase opposition with respect to the value represented by the graph 17; i. e., both values have opposite signs at all times.

The navigator of the aircraft therefore can distinguish between positions 10 and 20 in Fig. 1 by making a phase comparison between the time sequence with respect to which the direction finder is being alternately and repeatedly tuned from the station A to the station B and the corresponding motion of the pointer 15. The time sequence of the tuning changes is represented by the line 17, and the motion of the pointer 15 is represented by the line 18 in case of the position 10, by the line 21 in case of the position 20, and by the line 23 in case of the position 22. As illustrated in Fig. 3a, Fig. 3c, and Fig. 3e the position 10 of the airplane corresponds to an "in phase" condition and position 20 of the airplane corresponds to an "out of phase" condition.

The position of the airplane with respect to the line 12 is indicated on an instrument 25 shown in Fig. 2. The instrument 25 consists of a pointer 26 which is adapted to rotate with reference to a fixed scale 27. The scale 27 is provided with a reference line marked $A_1B_1$ which passes through the point of rotation of the pointer 26. The instrument 25 indicates the position of the airplane with reference to the line 12 passing through the stations A and B, and is responsive to the phase relationship between the curve 17 showing the tuning of the direction finder and the curves 18 or 21 or 23 showing the resulting motions of the pointer 15 in the indicator 14. If, for instance, the airplane occupies a position indicated by 10 in Fig. 1, i. e., if the airplane is located on the right hand side of the trajectory 12 for an observer located at A, and looking towards B, then the curve 17 showing the alternate tuning is in phase with the curve 18 showing the oscillations of the needle 15 and, consequently, the needle 26 deviates in the right direction from the line A₁B₁ on the scale 27. If the airplane occupies a position indicated by 20 in Fig. 1, i. e., if the airplane is located on the left hand side of the trajectory 12 for an observer located at A and looking towards B, then the curve 17 is out of phase with the curve 21 showing the oscillations of the pointer 15, and, consequently, the needle 26 deviates in the left direction from the line A₁B₁ on the scale 27. If, however, the airplane is aligned on the trajectory 12, then the bearing $\alpha_2$ is equal to the bearing $\beta_2$ and the needle 15 remains stationary and not affected by the alternate and repeated tuning of the direction finder to the stations A and B. Such condition is intermediate between the conditions represented by the lines 18 and 21 and graph representing the variation in the position of the pointer 15 is given by the line 23. Under such conditions the needle 26 will coincide with the lines A₁B₁ in the indicator 25.

It is therefore apparent that the indicator 25 will keep the navigator continually informed regarding the position of his airplane with respect to the trajectory 12.

Consider now the remaining elements of Fig. 2 representing a self-orienting radio compass, i. e., a compass system including apparatus for automatically maintaining the directional antenna oriented on the selected radio transmitting station. A coil wound directional or loop antenna 28 is mounted at the end of rotatable shaft 29, and arranged for free rotation in either direction over the full 360 degrees of arc. The loop antenna 28 consists of two individual loops 28₁ and 28₁₁ mounted concentrically and having their windings connected in series in such a manner that the terminal 30 connecting the loops 28₁ and 28₁₁ is the center tap of the antenna 28. The center tap 30 and the two output terminals 31 and 32 of the antenna 28 are connected to slip rings 33, 34, 35, respectively, said slip rings coacting with brushes 36, 37, 38, respectively, for electrical connection thereto. Low impedance wires 39, 40 electrically connect brushes 37, 38 to the radio receiver 41. Loop antenna 28 is preferably designed with low impedance turns in order to efficiently receive signal energy over a wide frequency range and transmit the received radio signals to remotely situated radio frequency units. The loop antenna 28 is mounted outside of the aircraft for most efficient signal pick-up. A streamlined housing indicated in dotted lines at 42 may be used to protect the loop antenna from wind currents, and external injury and to minimize its aerodynamic resistance. A non-directional antenna 43, such as mast, whip, or wire antenna is used to receive the same radio signal as the loop antenna and impress it upon the radio compass receiver 41.

The radio compass receiver 41 may be of any of the types well known in the art; for instance, of the type described in the U. S. Patent 2,308,521 on Automatic radio direction indicator, issued on January 19, 1943, to W. P. Lear, or of the type described in the U. S. Patent 2,257,757 on Radio compass navigation, issued on October 7, 1941, to F. L. Moseley. The radio compass receiver 41 that has been chosen in the present embodiment is of the type referred to in the U. S. Patent 2,257,757. The wiring diagram of the radio compass receiver is shown in Fig. 4 and its description is contained in the succeeding paragraphs.

The receiver 41 provides across its output terminals currents responsive to the orientation of the antenna 28 with respect to a transmitting station to which the antenna is tuned. The essential element of the self-orienting radio compass consists of a motor 44 controlled by the circuits 45 derived from the output of the receiver 41 and which by means of a worm and gear 46 is adapted to maintain automatically the loop 28 in the null position. Consequently, the action of the motor control circuits 45 brings the loop to null on the station to which the receiver is tuned, and this null is continually and automatically maintained without 180 degrees ambiguity, irrespective of changes in the heading of the airplane. The system is arranged to provide the pilot with a continuous bearing of the station being tuned throughout 360 degrees. These bearings are transmitted from the motor 44 by means of a flexible shaft 101 to the azimuth indicating pointer 15. The pointer therefore automatically swings to the desired station and is arranged to come to rest on the correct bearing without overshooting or hunting.

The radio receiver is provided with a dual tuning apparatus consisting of variable tuning systems designated by A₂ and B₂, respectively. Although in practice the tuning system would consist of several variable condensers, for purposes of illustration we have shown here single condensers.

The tuning system A₂ is adjusted to the frequency of the station A and the tuning system B₂ is adjusted to the frequency of the station B. A switch 50 is arranged to connect either the tuning system A₂ or the tuning system B₂ into operation in the compass receiver. The switch 50 consists of two stationary terminals 51 and 52 and of a non-conductive arm 53 pivoted at a point 54 and adapted to rotate around the point 54. The other end of the bar 53 is linked by a non-conductive rod 55 which is given a reciprocating motion by a crank 56 which in turn is driven by a motor 57. In the illustration shown in the figure the bar 53 is in contact with the terminal 52 and consequently the condenser B₂ determines the tuning of the receiver 41. The illustration shows also in dotted lines the alternate position of the bar 53 at which the contact is established with the terminal 51 and, consequently, the condenser A₂ determines the tuning of the receiver 41. The bar 53 is made to occupy alternately and repeatedly these two positions. Consequently, the receiver 41 is alternately and repeatedly tuned to the stations A and B.

The non-conductive rod 55 also actuates a switch 60. The switch 60 consists of two stationary terminals 61 and 62 and of a non-conductive bar 63 pivoted at a point 64 and adapted to rotate around the point 64. The terminals 61 and 62 are connected one to the other by means of a primary winding 65 of a transformer 66. A battery 67 is connected between the ground and the bar 63. The bar 63 is arranged to oscillate back and forth in synchronism with the bar 53 and is arranged to switch the battery 67 alternately to the terminal 61 and the terminal 62 of the transformer 66. The transformer 66 is arranged to generate across its output terminals 70 and 71 a voltage which is used as the reference phase. The transformer is also provided with a resistor 69 inserted across the terminals 70 and 71 in shunt with the secondary winding 68. The voltage across terminals 70 and 71 is synchronized with the action of the switch 50 and shall be designated as the phasing voltage.

This voltage will follow the positional variations of the curve 17, Fig. 3a. It is, however, apparent that the voltage generated across the terminals 70, 71 will have no D. C. component, and, consequently, in order to represent this voltage in its proper coordinates we must shift in Fig. 3a the axis upwards to a new position designated by the dash-dotted line 77.

The system shown in Fig. 2 is also provided with a tachometer generator 100 which is connected directly to the shaft 101 of the loop driving motor 44. The tachometer generator 100 is arranged to produce a D. C. voltage across the leads 102 and 103. This D. C. voltage is proportional to the angular velocity of the motor shaft 101 and, consequently, proportional to the angular velocity of the loop 28 and to the angular velocity of the pointer 15. The tachometer generator may be of any of the types well known in the art; for instance, of the type described in the British Patent 375,065 on "Electrical speedometers and generators," issued to A. A. Thornton. The tachometer generator that has been chosen in the present embodiment is illustrated in Fig. 5 and described in the succeeding paragraphs.

As stated in the preceding paragraph, the tachometer generator 100 is arranged to produce a D. C. voltage across the leads 102 and 103 which is proportional to the angular velocity of the motor shaft 101 or of the pointer 15. Furthermore, the D. C. voltage produced across the leads 102 and 103 has a polarity that represents the direction of the angular velocity of the motor shaft 101 or of the pointer 15. If the rotation of the motor shaft 101 and, consequently, of the pointer 15 is clockwise, then the D. C. voltage has a positive polarity. If, however, the motor shaft 101 and, consequently, the pointer 15 reverses its direction and rotates anticlockwise, then the polarity of the D. C. voltage reverses and becomes negative.

It is apparent that when the craft is at the location 10 as shown in Fig. 1 and the direction finder is alternately and recurrently tuned to the stations A and B in a manner shown by Fig. 3a, then the voltage appearing across the leads 102 and 103 varies with time in a manner shown in Fig. 3b. When, however, the craft is at the location 20 on the opposite side of the line AB, then the voltage appearing across the leads 102 and 103 varies with time in a manner shown in Fig. 3d.

The leads 102 and 103 are connected to a circuit which can be termed an integrator circuit and which is contained in the block 104. The integrator circuit consists of a resistor 105 inserted between the lead 103 and the terminal 73 and of a capacitor 106 inserted between the terminals 73 and 74. The integrator is arranged so that its output as appearing across terminals 73 and 74 is substantially proportional to the time integral of its input which is derived from the leads 102, 103. The purpose of this circuit is to reproduce across terminals 73 and 74 a voltage which is substantially proportional to the positional variations of the loop 28 or to the positional variations of the pointer 15.

It is therefore apparent that when the craft is at the location 10 and the direction finder is alternately and recurrently tuned to the stations A and B, the output voltage appearing across the terminals 73, 74 is represented by Fig. 3c. When, however, the craft is at the location 20 the corresponding output voltage across the terminals 73, 74 is represented by Fig. 3e. It is also apparent that in either case the mean value of the voltage across the terminals 73, 74 is zero. Consequently, the voltage across the terminals 73, 74 will have positive and negative values and in order to represent this voltage in its proper coordinates we must refer it to the time axis 78 in Fig. 3c or to the time axis 79 in Fig. 3e. Under such conditions the voltage generated across the terminals 73, 74 will be an A. C. voltage represented by the curve 18 and will not contain a D. C. component.

If the pointer 15 occupies a stationary position represented by the line 23, Fig. 3f, then the voltage across the terminals 73, 74 will be zero.

Consider now the integrator 104 and assume that the input function derived from the leads 102 and 103 is represented as $A_1(t)$ in which $t$ represents time. Then we obtain across the output terminals 73, 74 of the integrator a voltage which is proportional to $$\int_0^t A_1(t)\,dt$$

The manner in which this output voltage is produced can be explained as follows:

Let C be the capacitance of the capacitor 106, R the resistance of the resistor 72, and $i(t)$ the current flowing through the resistor 105. Assume also that the output terminal 73 of the integrator 104 has been disconnected from the circuit contained in the dotted rectangle 80 that shall be described hereafter. Consequently, the same current $i(t)$ flows through the capacitor 106 and through the resistor 105 and the following relation holds true:

$$A_1(t) = Ri(t) + \frac{1}{pC}i(t)$$

where $p$ denotes the operator $$\frac{d}{dt}$$

(as used in the Heaviside's operational calculus). See Carson: J. R. Carson, "Electric Circuit Theory and Operational Calculus," McGraw-Hill Book Co., New York, N. Y., 1926. Following the methods of operational calculus the current $i(t)$ can be expressed as follows:

$$i(t) = \frac{pC}{pCR+1}$$

And the voltage $A_1(t)$ across the capacitor 106 can be represented as follows:

$$A_2(t) = \frac{1}{pCR}A_1(t)$$

By taking $CR \gg 1$ the following relation may hold with an approximation satisfactory for practical purposes:

$$A_2(t) = \frac{1}{pCR}A_1(t)$$

which by using conventional notation may be written as:

$$A_2(t) = \frac{1}{CR}\int_0^t A_1(t)\,dt$$

Consequently, the expression which represents the voltage drop $A_2(t)$ across the condenser 106 between the output terminals 73 and 74 represents the time integral of the input voltage $A_1(t)$. The above relation results from the assumption that $$pCR + 1 \approx pCR$$

and the approximation obtained has been found to be satisfactory by taking C equal to 1 microfarad and R equal to 300,000 ohms.

The integrator referred to above is well known in the art and its description may be found in the U. S. Patent 2,099,536 issued to S. A. Scherbatskoy et al. in pages 5 and 6 and is illustrated in Fig. 4 of the said patent.

The arrangement illustrated in Fig. 2 is also provided with a device included in a dotted rectangle 80 and which shall be referred to hereafter as the "ring modulator." The ring modulator is provided with two pairs of input terminals which are designated by 73, 74 and 70, 71, respectively, and with one pair of output terminals designated by 81, 82. The ring modulator is well known in the art and has been described in U. S. Patent 2,025,158 issued on December 24, 1935, to F. A. Cowan and in an article by R. S. Carruthers on "Copper oxide modulators in carrier telephone systems," The Bell System Technical Journal, vol. XVIII, 1939, pp. 315–337. The type of the circuit contained in the dotted rectangle 80 is illustrated in Fig. 2c, page 318, of the said article.

The ring modulator is essentially a double balanced modulator. By double balanced is meant a modulator in which each input is balanced out from the output, and the output contains, therefore, substantially only the modulation products.

Across the output terminals 81 and 82 of the modulator 80, therefore, appears a signal which among other modulation products contains signals corresponding to the product between the signal supplied from terminals 70, 71 and the signal supplied from terminals 73, 74. As described above, the signal supplied from the terminals 70, 71 can be represented by the line 17 in Fig. 3a and will be referred to as the phasing voltage. The signal supplied from the terminals 73, 74 will be referred to as the signal voltage and it can be represented either by the line 18 of Fig. 3c when the airplane is in position 10 or by the line 21 of Fig. 3e when the plane is in position 20 or by the line 23 of Fig. 3f when the airplane is in position 22. It is apparent that the phasing voltage 17 and each of the signal voltages 18, 21, 23 will have no D. C. component, and, in particular, the signal voltage corresponding to the line 23 is continuously zero since the time axis in Fig. 3f coincides with the line 23. It is also apparent that the phasing voltage 17 and each of the signal voltages 18, 21 have the same fundamental frequency and they produce across the output terminals 81, 82 a strong D. C. component the polarity of which will indicate the phase relationship between the phasing voltage and the signal voltage. If the input terminals 73, 74 of the modulator 80 receive the signal voltage 18 which is in phase with the phasing voltage applied across the input terminals 70, 71, then a D. C. voltage of a certain polarity will appear across the output terminals 81, 82. If, however, the input terminals 73, 74 receive the signal voltage 21 which is out of phase with the phasing voltage applied across the terminals 70, 71 then a D. C. voltage of opposite polarity will appear across the output terminals 81, 82. In a similar manner, if the input terminals 73, 74 receive a signal voltage zero represented by the line 23, then zero voltage will appear across the output terminals 81, 82.

Consequently, the polarity of the voltage appearing across the terminals 81, 82 can be used as an index of the position of the airplane with respect to the trajectory 12. If, for instance, the airplane occupies the position 10, then the signal voltage across the terminals 73, 74 will be represented by the line 18 and, consequently, across the terminals 81, 82 there will appear a D. C. output of a determined polarity. If, for instance, the airplane occupies the position 20, then the signal voltage across the terminals 73, 74 will be represented by the line 21 and, consequently, across the terminals 81, 82 there will appear a D. C. output of opposite polarity. If, however, the airplane occupies the position 22, then the signal voltage across the terminals 73, 74 will be zero and across the terminals 81, 82 there will appear a zero voltage.

The voltage derived from the terminals 81, 82 is applied to the indicator 25 and, consequently, if, for example, the indicator 25 shows a positive voltage the airplane is located at the right hand side of the line 12; for instance, at 10. If the indicator shows a negative voltage the airplane is located at the left hand side of the line 12; for instance, at 20. If, however, the indicator 25 shows the voltage zero, the airplane is located on the trajectory 12, for instance, at 22.

The indicator 25 is provided with a rotatable pointer 26 and a fixed scale 27. The fixed scale 27 is marked with a line designated as $A_1B_1$ which represents symbolically the trajectory 12 passing through the stations A and B. The pointer 26 is adapted to rotate around the midpoint of the segment $A_1B_1$ in such a manner that the position of the pointer with respect to the line $A_1B_1$ will indicate the position of the airplane with respect to the line 12. The indicator 25 is a conventional d'Arsonval type meter with a center zero having the reference line $A_1$—$B_1$ inscribed upon the face thereof through the zero scale mark. A Weston type 301 milliammeter, as described at page 52 and illustrated at page 10 of catalog No. 12 of the Weston Electrical Instrument Co., 614 Frelinghuysen Avenue, Newark, New Jersey, and having a range of plus and minus 10 milliammeters is well adapted for use in performing the described indicating function. If, for instance, the airplane is aligned on the trajectory 12 the pointer 26 will coincide with the line $A_1B_1$ on the instrument. In case the airplane is located on the right side of the line 12 such as, for instance, in position 10 in Fig. 1 the pointer 26 will deviate to the right. If, however, the line will be located on the opposite side of the line 12, for instance, at the position indicated by 20, then the pointer 26 will deviate to the left of the line $A_1B_1$. It is therefore apparent that the indicator 25 will inform the navigator regarding the position of the airplane with respect to the trajectory 12 and will assist the navigator to align his airplane along the trajectory 12.

Consider now the ring modulator circuit contained in the rectangle 80. The circuit shown therein comprises a bridge circuit consisting of four rectifiers 83, 84, 85, 86, each of the said rectifiers constituting a separate arm of the bridge circuit and arranged so that the current can flow only in an anticlockwise direction. The upper corner of the bridge 93 and the lower corner of the bridge 94 are respectively connected to the input terminals 73, 74 and are also connected one to the other by means of equal resistances 87 and 88 in series. The other corners of the bridge 96, 95 are respectively connected to the output terminals 81, 82 and are also connected one to another by a pair of equal resistances 89 and 90 in series. The other input terminals 70, 71 of the ring modulator are respectively connected to the point 91 connecting the resistance 87, 88 and to the point 92 connecting the resistances 89, 90.

With the circuit as described, current derived from the terminals 73, 74 may flow either through the rectifiers 84, 85 or through the rectifiers 86, 83 depending upon its direction, but it can never flow through all the four rectifiers at the same time, since the rectifiers 84, 85 on one hand and the rectifiers 83, 86 on the other hand are arranged to flow in opposite directions.

Suppose, however, for purposes of illustration, that the phasing current signal derived from the terminals 70, 71 and the signal current derived from the terminals 73, 74 are simultaneously applied and suppose that both voltages are in phase, i. e. the terminal 70 becomes positive as compared to the terminal 71 and the terminal 73 becomes positive as compared to the terminal 74. Then the phasing current tends to flow from the terminal 70 to the terminal 91 and through the resistor 87 to the terminal 93 and then through the rectifier 84 and through the resistor 89 back to the terminal 71. The other part of the phasing current tends to flow from the terminal 70 to the terminal 91 and through the resistor 88 back to the terminal 94 and through the rectifier 86 and through the resistor 90 back to the terminal 71. The currents flowing through the resistors 89, 90 are equal and of opposite directions and, consequently, there is no voltage across the terminal 81 and 82.

It is apparent that under these conditions the polarity of the terminals 93, 94 will be positive with respect to the polarity of the terminals 95, 96. Consequently, positive voltages are applied to rectifiers 84, 86. Therefore, these rectifiers will lose their ability of rectifying currents, and will allow currents to traverse them in both directions. At the same time negative voltages are applied to rectifiers 83, 85. Consequently, the rectifiers 83, 85 will retain their rectifying ability and will block currents attempting to traverse them in the negative direction. Therefore, the rectifiers 84 and 86 are conductive in both directions, and, consequently, when a signal voltage is being developed across the terminals 73, 74 we find that a current tends to pass from the terminal 73 to the terminal 93 and then through the rectifier 84, through the resistors 89 and 90 to the terminal 95, then through the rectifier 86 back to the terminal 74. This current superposes itself upon the current which is already flowing through the resistors 89 and 90 and, consequently, the resultant current passing through the resistor 89 becomes larger than the current passing through the resistor 90. Consequently, the balancing that existed before is offset because there is a situation where the current flow through the resistor 89 is increased as compared to the current flow through the resistor 90. Thus the voltage drop across the resistor 89 becomes greater and a positive overall voltage is developed across the terminals 81 and 82. It is thus apparent that the existence of the two voltages, in phase, one applied to the terminals 70, 71 and the other applied to the terminals 73, 74 creates a voltage across terminals 81, 82 of a definite polarity.

It can be shown that if the polarity of the signal voltage would reverse with respect to the phasing voltage, i. e., if we suppose that the terminal 70 becomes positive as compared to the terminal 71, and the terminal 73 becomes negative as compared to the terminal 74, then the balance becomes offset in the opposite direction, because there is a situation where the current flow through the resistor 90 is increased as compared to the current flow through the resistor 89. Then the voltage drop across the resistor 89 becomes smaller and the overall voltage developed across the output terminals 81 and 82 has a polarity opposite to the case described above.

It can also be shown that if the signal voltage becomes zero, i. e., if the potential of the input terminal 73 becomes the same as the potential of the input terminal 74, then the potential of the terminals 93, 94 and, consequently, of the terminals 81, 82 are also the same. Then the D. C. voltage output from the ring modulator is zero.

In general, if we designate the phasing voltage applied across the terminals 70, 71 as $E_1 \sin \omega t$ and the signal voltage applied across the terminals 73, 74 as $E_2 \sin (\omega t + \phi)$, then the voltage developed across the output terminals 81, 82 can be represented as $E_2 \cos \phi$.

As stated in the preceding paragraphs the voltage derived from the output terminals 81, 82 of the ring modulator 80 is applied to the indicator 25 and the behavior of the indicator 25 is therefore such that the magnitude of the deflection of the pointer 26 indicates the magnitude of the deflection of the curves 18 or 21 on Fig. 3 and the same magnitude of deflection is determined by the phase relationship between these curves and the curve 17 of Fig. 3a.

Consider now more in detail Fig. 4. Fig. 4 shows diagrammatically a navigational instrument that is substantially identical to the one shown on Fig. 2, and, therefore, similar elements in Fig. 2 and Fig. 4 are designated by the same numerals. Fig. 4 shows, however, a circuit diagram of a radio receiver compass that has been diagrammatically designated in Fig. 2 by numeral 41. In the following paragraph a description will be given only of the circuit that is contained within the block 41. Other circuit elements outside of the block 41 are designated in Fig. 2 and Fig. 4 by the same numerals and their performance has already been described above in connection with Fig. 2. Referring now more particularly to Fig. 4, the loop 28 has its output fed through leads 39, 40, through the double rectifier tube 437 and through resistor 441 to ground; from tube 437 the directional R. F. signal from the antenna 43, this later signal passing through transformer 442 and leads 443.

An oscillator tube circuit 444 is energized from D. C. supply leads 454, 454' through connecting leads 455, 455' and supplies a low frequency alternating current, of large amplitude compared to the radio signals received on the loop, through transformer 445 and similar windings 446, 446' through R. F. chokes 450, 450' to the plates of double rectifier tube 437. This low frequency A. C. acts as an alternating bias so as to cause the signal from the divided loop 28 to be alternately reversed in phase while being added to the output of the non-directional antenna 43, whereby the voltage drop across the resistor 447 in the common plate-cathode circuit of tube 437 is caused to contain three principal components when the loop 28 is in position to receive energy from a transmitting station.

These three components are, firstly, a R. F. voltage supplied from loop 28 through tube 437 proportional to the strength of the received signal and to the angular position of loop 28 in the R. F. field; secondly, a voltage supplied from non-directional antenna 43 proportional to the received signal; and thirdly, a low frequency alternating voltage from oscillator 444 dependent in magnitude on the R. F. unbalance at the plates of tube 437. Rectifier 437 thus serves as an electronic switch and as a balanced modulator, so that a modulated R. F. signal is fed to the grid of tube 441 whenever loop 28 is turned in the R. F. field to a receiving position.

The sign of the modulation is reversed, i. e., the peak of the modulation envelope is shifted 180° as divided loop 28 is turned to right or left from its null position with respect to the incoming signal by virtue of the addition of the non-directional R. F. voltage in the rectifier plate circuit across resistor 447. The modulation envelope is fed through the untuned R. F. amplifier stage 441 to the amplifier and detector 448 of any suitable type. By detector action, the low frequency modulation is obtained and brought out on leads 451 and supplied to a transformer 452 from which it is fed in push-pull to the grids of triode tubes 453, 453'.

The plate circuits of the tubes 453, 453' contain operating coils 457' and 458' of reversing relays 457 and 458. Plates of tubes 453, 453' and coils 457', 458' are fed with A. C. from oscillator 444 through transformer 445, lead 459 and leads 460 and 460'. This circuit functions as a selective device to operate one or the other of the relays 457, 458, depending upon the direction in which the loop 28 is turned with respect to its null position, i. e., upon the phase of the audio output of transformer 452.

The motor 44 is a standard D. C. motor provided with an armature winding mounted upon the shaft 101 and an excitation winding, said armature and excitation winding are not shown in the figure. The motor is provided with two pairs of input leads 464 and 501, the leads 464 are arranged to connect the armature of the motor 44 with relays 457, 458, and the leads 501 are arranged to supply a constant D. C. current from supply terminals 500 to the excitation winding of the motor 44. Operation of one of the relays 457 or 458 connects the armature of motor 44 in one direction across the D. C. supply leads 461, 462, whereas operation of the other of these relays reverses the connection of this armature across leads 461, 462, hence reversing the direction of operation of the motor 44. Thus, with coil 457' of relay 457 energized, current from lead 461 passes through current limiting resistance 463, the outer and center contacts of relay 457, lead 464 through the armature of motor 44, and the center and inner contacts of relay 458 to lead 462; whereas with coil 458' of relay 458 energized, current from lead 461 passes through resistance 463, the outer and center contacts of relay 458, lead 464 up through the armature of motor 44, and the center and inner contacts of relay 457 to lead 462. Thus, motor 44 serves to turn loop 28 to maintain the same in its null position with respect to the received signal and also simultaneously positions the pointer 15 with respect to the scale 14. Condensers 466 and 466', connected in shunt with coils 457' and 458', serve to filter the rectified A. C. in the relay coils to give approximately equivalent D. C. operation. Inasmuch as the plates of tubes 453, 453' are energized from the same low frequency source as that supplying the modulating frequency to double rectifier 437, namely oscillator 444, these tubes will detect any reversal in phase of the audio signal output of amplifier-detector 448 due to shift of loop 28 from null position thereby serving to drive motor 44 in the proper and shortest direction to cause indicator 15 to always correctly indicate the bearing of the transmitting station. The system is thus free of 180° ambiguity present in systems requiring mental interpretation of a right-left or other indicator, the reading of which is the same for 0 and 180° bearings.

In order to prevent overrunning and hunting of motor 44, the back E. M. F. across the armature of this motor, which is dependent among other things upon the motor speed, is conveyed through leads 464 and resistors 468 and 468' to the grid bias circuit of tubes 453 and 453' through dividing resistors 469, 469'. Thus, the voltage across the armature of motor 44 acts on tubes 453, 453' in a direction to cut the plate current of the driving tube 453 or 453', as the case may be, to zero before the loop is fully restored to null position, whereby motor 44 is brought to rest in a dead beat manner and without overshooting. This method of preventing hunting is disclosed in the above referred to U. S. Patent 2,257,757 issued to Moseley.

In operation, any misalignment of the loop 28 with respect to the incoming signal direction causes a modulated R. F. signal to be fed from rectifier-modulator 437 to the grid of amplifier tube 441, the sign of such modulation depending upon whether the loop is turned to the right or left of its null position. The amplified low-frequency modulated R. F. envelope enters the amplifier-detector 448, from which it issues as low frequency to select either relay 457 or 458 and cause motor 44 to run and drive loop 28 to its null position, thus cutting off the input modulation envelope and reducing the output low frequency as this null is reached. The speed or back E. M. F. voltage from the motor armature, by being introduced into the relay grid circuit in a direction to cut off the relay actuating tube 453 or 453', and increase the plate current in the non-operating tube, serves to return the relays to normal position before the system reaches a balance, thereby avoiding overshooting and hunting.

Consider now Fig. 5 showing diagrammatically the tachometer generator 100. The tachometer generator is essentially a D. C. generator which consists of a permanent magnet 110 fixedly mounted upon a suitable support 111 and an armature 112 operatively engaged with the magnet 110 and driven by the shaft 101. The armature is provided with a collector 113 mounted upon the shaft 101 concentrically therewith and to brushes 114 fixedly mounted so as to contact the successive segments of the collector, while said collector is driven by the shaft 101. It is apparent that the windings of the armature 112 when driven by the shaft 101 cut the magnetic flux produced by the permanent magnet and generate across the brushes 114 of the collector 113 a D. C. voltage that is proportional to the rotatory speed of the armature, the polarity of said voltage being dependent upon the direction according to which the armature rotates. When the armature 112 rotates clockwise, the voltage obtained across the brushes 114 has a positive polarity and when the armature rotates anticlockwise, said voltage has a negative polarity.

The arrangement shown in Fig. 2 as stated previously is used in conjunction with a self-orienting type of radio direction finder. Fig. 6 illustrates my invention when it is used in connection with the homing type of radio compass. The homing radio compass illustrated in Fig. 6 is of the type described in the U. S. Patent 2,266,038 issued to W. S. Hinman, Jr., on December 16, 1941.

Referring now more particularly to Fig. 6, there is set forth a system wherein 300 indicates a receiving direction finding loop provided with two tuning systems A3 and B3 and tapped in the center in the well known manner of a homing compass or left-right directional receiving means and embodying the grounding rectifier unit contained in the block 301, which alternately causes first one half of the loop unit and then the other half to be effective. A radio receiver 302 is provided and is used for amplifying and detecting the signal received on the antenna 300. The receiver 302 is connected to a rectifier grounding unit 303 which alternately affects the direction of current flow through an output meter 304 providing zero-center indication. A low audio frequency unit 305 supplies an audio frequency current to both the input unit 301 and the output unit 303 properly phased to secure proper reversal of the meter unit 304 as the field pattern of the antenna is reversed.

Referring to the block 301, loop antenna 300 is connected at each terminal through blocking condensers 317 and 318 to rectifier tubes 319, 320, the filaments of which are connected together and grounded. Two equal alternating voltages of the same frequency but opposite in phase, are applied from ground to the plates of 319 and 320 through equal radio-frequency inductors 321 and 322. Consequently, when a positive voltage is applied to the plate of 319, a negative voltage is applied to the plate of 320, and vice versa. It is well known that when a positive voltage is applied to the plate of a suitable rectifying device the resistance of that device is relatively low, but when a negative voltage is applied to the plate, its resistance is relatively high. For this reason the ground is effectively placed at each end of the loop antenna, alternately, once for each cycle of the alternating voltage supplied by the synchronizing unit and the normal field pattern of the loop antenna is altered. The voltage developed in the loop antenna is applied to the radio receiver 302, between the center of the loop antenna and ground.

The radio receiver 302 requires no explanation, being any of the usual types, for example, a radio-frequency amplifier, a detector, and an audio amplifier. It must, of course, be capable of receiving the frequencies for which the loop antenna is designed.

In the circuit arrangement of output unit 303, 323, and 324 are two equal capacitors, one terminal of each being connected to the output of the radio receiver, and the other terminal of each connected to half wave rectifiers 326 and 325, respectively, which pass current only when a positive voltage is applied to them. The other terminals of 326 and 325 are connected one to each side of a resistor 327 to the output meter 304, and to condensers 328 and 329 as shown. The condensers 328 and 329 are each connected to ground at one terminal and the center tap of the resistor 327 is connected to ground. The half wave rectifiers 325 and 326 are supplied with equal alternating voltages of the same frequency, but opposite in phase, through inductors 330 and 331. Thus, when a positive voltage is applied from ground to one side of the half wave rectifier 325 a negative voltage is applied from the ground of one side of 326, and vice versa, so that during one half cycle of the applied alternating voltage 325 passes current tending to deflect the pointer of the output meter 304 in one direction, and during the other half cycle 326 passes current tending to deflect the pointer of the output meter 304 in the other direction. These currents are equal and opposite, and the pointer of the output meter 304 remains at zero in the center of the scale.

The output unit 303 may be readily synchronized with the input unit 301 by applying as its low frequency alternating voltage the same voltage that is applied to unit 301. Unit 305 accomplishes this. A transformer 332 is necessary for proper phasing of the voltage, but any source of supply may be used, preferably a low frequency audio oscillator.

It is apparent that the current passing through the rectifier tubes 319, 320 and produced by the voltage of the audio oscillator 305 causes the output meter 304 to deflect in opposite directions. Since the voltage of the audio oscillator 305 is applied equally to these rectifier tubes, the currents are equal and the course indicator reads zero. Remembering that when the rectifier 319 passes current one loop antenna field pattern is produced and current passes through the output meter 304 in one direction and when the rectifier 320 passes current another field pattern is produced and current passes through the output meter 304 in the other direction, consider the effect of an incoming radio wave. When the loop antenna is grounded at one end, the signal at the output of the radio receiver 302 is proportional to the field pattern for that condition, and the current through the output meter 304 is proportional to the voltage of the audio oscillator and the output voltage. When the loop antenna is grounded at the other end similar conditions hold, but there is a reversal of current in the output meter 304, since the currents through the output meter 304 due to the audio oscillator 305 are equal and opposite, currents deflecting the output meter 304 right or left are directly proportional to the difference between the output voltage due to each field pattern.

In order to make my invention with a homing type directional device it is necessary to equip the homing type radiocompass with an automatic volume control, i. e., with a type of volume control that has very complete action and which makes the output independent of the input strength over a large range of input signal strengths. On Fig. 6 I have, therefore, designated as numeral 302 a radio receiving set with automatic volume control.

It is apparent that in an absence of volume control in the receiver 302 the indication of the output meter 304 will represent the difference of the two signals corresponding to output voltages of two different field patterns. Consequently, the indication of the output meter 304 will be a function not only of the bearing of the transmitter station but also of the strength of the signals received from the transmitting station. Under such conditions two different transmitting stations having the same bearing will give different readings on the output meter 304, because the stronger station will give a larger deviation. In order, therefore, to make my indicating system independent of the strength of the signal received, and responsive only to the direction from which the signal arrives I provide an automatic volume control in the receiver 302 which maintains the mean value of the signal received by 302 at a predetermined level. Under such conditions the output meter 304 will indicate a difference of two signals the mean value of which is maintained constant. It is apparent that such a difference is indicative of the ratio of these two signals. It is also apparent that the ratio of the two signals depends only upon the bearing of the transmitting station and is independent of the strength of the signal received from the said station. Consequently, as the airplane approaches the transmitting station the sensitivity of the output meter 304, i. e., the amount of deflection per degree of deviation of heading of the airplane is maintained substantially constant. The bearing is indicated on the scale of the output meter 304 and is zero for the centered position. Any angular deviation of the longitudinal axis of the airplane or of the loop antenna of the receiving apparatus to the right or left of said alignment will cause a corresponding directional deflection of the needle.

As shown in Fig. 6 the antenna 300 is provided with a dual tuning apparatus consisting of variable tuning systems designated by $A_3$ and $B_3$, respectively. The tuning system $A_3$ is adjusted to the frequency of the station A and the tuning system $B_3$ is adjusted to the frequency of the station B. A switch 340 is arranged to connect either the tuning system designated by $A_3$ or the tuning system designated by $B_3$ into operation. The switch 340 consists of two stationary contacts 341 and 342 and of a conductive arm 343 pivoted at point 344 and adapted to rotate around the point 344. The other end of the bar 343 is linked by a non-conductive rod 345 which is given a reciprocating motion by a crank 346 which in turn is driven by a motor 347.

Consequently, the antenna 300 is alternately and repeatedly tuned to the stations A and B.

The motor 347 also impresses a reciprocating motion upon non-conductive rod 348 and drives a switch 350 which consists of two stationary contacts 351 and 352 and of an arm 353 pivoted at point 354 and adapted to rotate around the point 354. The contacts 351 and 352 are connected by means of a primary winding 355 of a transformer 356. A battery 357 is connected between the ground and the bar 353. The bar 353 is arranged to oscillate back and forth in synchronism with the bar 343 and is arranged to switch the battery 355 alternately to terminal 351 and terminal 352 of the transformer 356. The transformer 356 is arranged to generate across its output terminals 360 and 361 a voltage which is used as the reference phase. The transformer is also provided with a resistor 359 inserted across the terminals 360 and 361. The voltage across the terminals 360 and 361 is represented by the curve 17 of Figure 3a and varies in step wise manner from a voltage value corresponding to the time during which the radio receiver is tuned to station A to a value corresponding to the time during which the receiver is tuned to station B.

The system shown in Fig. 6 is also provided with a transformer 365 consisting of a primary winding 366 connected to the resistor 327 and a secondary winding 367 having its output terminals designated as 373 and 374. It is apparent that across the output terminals 373, 374 there appears a voltage which is substantially proportional to the positional variations of the pointer of the output meter 304.

The arrangement illustrated in Fig. 6 is also provided with a ring modulator included in the dotted rectangle 380. The ring modulator serves to combine the voltage appearing across the terminals 360 and 361 and the voltage supplied from the terminals 373, 374 in a manner similar to the ring modulator 80 of circuit in Fig. 2 and produces across the output terminals 381, 382 a voltage representing the product of the signal supplied from terminals 373, 374. As described above, the signal supplied from the terminals 360, 361 can be represented by the line 17 in Fig. 3a and will be referred to as the phasing voltages. The signal supplied from the terminals 373, 374 will be referred to as the signal voltage and it can be represented either by the line 18 of Fig. 3c when the airplane is in position 10, or by the line 21 of Fig. 3e when the airplane is in position 20, or by the line 23 of Fig. 3f when the airplane is in position 22. It is apparent that the phasing voltage 17 and each of the signal voltages 18, 21, 23 will have no D. C. component, and, in particular, the signal voltage corresponding to the line 23 is continuously zero since the time axis in Fig. 3f coincides with the line 23. It is also apparent that the phasing voltage 17 and each of the signal voltages 18, 21 have the same fundamental frequency and they produce across the output terminals 381, 382 a strong D. C. component the polarity of which will indicate the phase relationship between the phasing voltage and the signal voltage. If the input terminals 373, 374 of the modulator 380 receive the signal voltage 18 which is in phase with the phasing voltage applied across the input terminals 360, 361, then a D. C. voltage of a certain polarity will appear across the output terminals 381, 382. If, however, the input terminals 373, 374 receive the signal voltage 21 which is out of phase with the phasing voltage applied across the terminals 360, 361, then a D. C. voltage of opposite polarity will appear across the output terminals 381, 382. In a similar manner, if the input terminals 373, 374 receive a signal voltage zero represented by the line 23, then a zero voltage will appear across the output terminals 381, 382.

The voltage derived from the terminals 381, 382 is applied to an indicator 395 which may be of the same type as indicator 25, described above. The indicator 395 is provided with a pointer 396 which is adapted to rotate around the point located on a reference line $A_4B_4$. The purpose of this instrument is to indicate the relative position of the plane with respect to the line 12 referred to on Fig. 1. If, for instance, the airplane is aligned on the line 12 the pointer will coincide with the line $A_4B_4$ on the instrument. In case the plane is located on the right side of the line 12, such as, for instance, in the position 10 in Fig. 1, the pointer 396 will deviate to the right. If, however, the aircraft is located on the opposite side of the line 12 at the position 20 in Fig. 1, then the pointer will deviate to the left of the line $A_4B_4$. It is, therefore, apparent that the indicator 395 will inform the navigator regarding the position of the airplane with respect to the line 12 and will assist the navigator to align his airplane along the trajectory 12.

It is therefore apparent that I have modified a conventional radio compass by providing it with dual tuning so that the tuning can be switched from one condenser gang to another condenser gang. Thus, when the switches are thrown the radio compass is tuned either by condenser A or by condenser B, as shown in the embodiment of Fig. 2. In the embodiment of Fig. 6, the condensers to which the compass is timed are designated as $A_3$ and $B_3$, respectively. By throwing the switches from one position to the other, therefore, it is possible to switch the tuning of the radiocompass from one frequency to another. This switching action is performed periodically by means of the motor-driven crank as shown. In reference to the examples under consideration, it has been assumed that the two tuning controls on the radiocompass are alternately and repeatedly referred to stations A and B, respectively. As the tuning is switched from station A to station B the output current from the radio compass receiver will fluctuate. In the embodiment of Fig. 2 the term "output current of the radio direction finder" designates the current that represents the motion of the indicating pointer 15. In the embodiment of Fig. 6 the term "output current of the radio direction finder" designates the current that represents the motion of the indicating pointer on the scale 304. Either of the embodiments of Fig. 2 and Fig. 6 is arranged so as to compare automatically the phase of the fluctuations in the output current of the radio direction finder to the reference phase signal supplied by the reversing switch that varies in accordance with the tuning of the radio direction finder from the station A to the station B. When the output fluctuations are in phase with the reference signal the ship is on one side of the navigational path that passes through the stations and when the fluctuations are out of phase the ship is on the other side of the navigational path. This phase comparison is accomplished by means of a balanced ring modulator. In the case of the homing type direction finder shown in Fig. 6, the output fluctuations consist of positive or negative current impulses, and in the case of the direction finder of the self-orienting type shown in Fig. 2, the fluctuations consist of positive and negative current impulses representing clockwise or counter-clockwise rotation of the loop.

The mechanically driven reversing switch is arranged to provide the reference phase corresponding to the action of the switches that control the tuning of the radiocompass. The ring modulator is connected so as to compare the phase of the fluctuations of the output from the radiocompass with that of the current supplied by the reversing switch. It has been shown that when the phases are in coincidence the current supplied to the main indicator will have a given polarity and when the phases are in opposition one with the respect to the other, this current will have the opposite polarity. Thus, the main indicator provides an indication which in turn is determined by the position of the ship with respect to the navigational line.

In the above paragraphs I have limited my discussion to a navigational problem illustrated in Fig. 1 in which it is desired to guide a craft along a line passing through two ground transmitters A and B, while the craft is located on one side of both transmitters and is made to move away from them along the line AB. In the present discussion I shall consider a different situation illustrated in Fig. 7 in which the craft is located on one side of both transmitters and is made to approach them along the line AB. Assume that the craft is located at a position indicated by the numeral 10₁ and that the direction finder is tuned to the station A. The direction finder is of the self-orienting type shown in Fig. 2. Then the indicating pointer 15 of the direction finder will show an angle $\alpha$, said angle $\alpha$ being indicated in Fig. 7 as the angle between the longitudinal axis CD of the craft and the direction CA of the transmitter A. When, however, the direction finder is tuned to the station B, then the indicating pointer will show an angle $\beta$ said angle $\beta$ being indicated in Fig. 7 as the angle between the longitudinal axis CD of the craft and the direction CB of the transmitter B. It is apparent that during the alternate and recurrent tuning of the direction finder in accordance with the line 17 of Fig. 3a, the pointer 15 will oscillate back and forth between two positions: the position indicating the angle $\beta$ corresponding to station B, and the position indicating the angle $\alpha$ corresponding to station A. The frequency of these oscillations will be the same as that of the periodic switching process and the mean position that the pointer 15 will occupy during the oscillatory process represents the mean orientation CM.

It is apparent from the inspection of Fig. 7 that during said oscillatory process the angular velocity of the pointer 15 will alternate between positive and negative values, the positive values corresponding to the clockwise rotation, and negative values corresponding to the anticlockwise rotation. It is further apparent that the angular displacement of the pointer with reference to the mean position CM will be positive (clockwise) when the pointer becomes oriented towards the station B (corresponding to the angle $\beta$). Furthermore, the angular displacement of the pointer with reference to the mean position CM will be negative (anticlockwise) when the pointer becomes oriented towards the station A. Therefore, the variation of the angular velocity of the pointer with respect to time is represented by Fig. 3b and the variation of the angular displacement with respect to time is represented by Fig. 3c. We may state, therefore, that the motion of the pointer 15 that corresponds to the alternate tuning of the direction finder, will be the same when the craft occupies the position 10 in Fig. 1 or when the craft occupies the position 10 in Fig. 7.

Assume now that the craft is located on the other side of the line AB at a position indicated by the numeral 20₁ in Fig. 7. It is apparent that during the alternate and recurrent tuning of the direction finder in accordance with the line 17 of Fig. 3a, the pointer 15 will oscillate back and forth between two positions: the position indicating the angle $\beta$, corresponding to station B, and the position indicating the angle $\alpha$, corresponding to station A. The frequency of these oscillations will be the same as that of the periodic switching process and the mean position that the pointer 15 will occupy during the oscillatory process represents the mean orientation $C_1M_1$. It is apparent that during said oscillatory process the angular velocity of the pointer 15 will alternate between positive and negative values. Furthermore, the angular displacement of the pointer with reference to the mean position $C_1M_1$ will be positive when the pointer becomes oriented towards the station A (corresponding to the angle $\alpha_1$) and the angular displacement will be negative when it becomes oriented towards the station B (corresponding to the angle $\beta_1$). Therefore, the variation of the angular velocity of the pointer with respect to time is represented by Fig. 3d and the variation of the angular displacement with respect to time is represented by Fig. 3e. We may state, therefore, that the motion of the pointer 15 will be the same when the craft occupies the position 20 in Fig. 1 or when the craft occupies the position 20₁ in Fig. 7.

Consider now the craft at the position $22_1$ in Fig. 7. Then, when the direction finder is tuned to the station A, the indicating pointer 15 will show an angle $\alpha_2$ between the longitudinal axis of the craft $C_2D_2$ and the direction $C_2A$ of the transmitter A. When the direction finder is tuned to the station B, then the pointer 15 will indicate the angle $\beta_2$ between the longitudinal axis of the craft $C_2D_2$ and the direction $C_2B$ of the transmitter B. It is apparent that the direction $C_2B$ coincides with the direction $C_2A$ and, consequently, $\alpha_2 = \beta_2$. Therefore when the direction finder is being switched alternately and repeatedly from the station A to the station B, the pointer will be stationary and will occupy a position corresponding to the angle $\alpha_2 = \beta_2$. Consequently, there will be no oscillation and the pointer will have a position represented diagrammatically in Fig. 3f.

It is now apparent that the motion of the pointer 15, or of the shaft 101 will be the same when the craft is located on one side of the line AB at the position 10 in Fig. 1 or at position $10_1$ in Fig. 7 and will be represented by Fig. 3c. Furthermore, the motion will be the same when the craft is located on the other side of the line AB at the position 20 in Fig. 1 or at the position $20_1$ in Fig. 7 and will be represented by Fig. 3e. When the craft is located on the line AB at the position 22 in Fig. 1 or at the position $22_1$ in Fig. 7, the pointer is stationary. Consequently, when the craft is located at position 10 or $10_1$, there will be a phase coincidence between the line 17 representing the switching and the line 18 representing the motion of the pointer 15 and, therefore, the pointer 26 of the indicator 25 will be deflected to the right. If, however, the craft is located at position 20 or $20_1$, there will be a phase opposition between the line 17 and the line 21 representing the motion of the pointer 15. Then the pointer 26 of the indicator 25 will be deflected to the left. If the craft is located on the line AB at the position 22 or at the position $22_1$, there will be no deflection of the pointer 26 of the indicator 25.

It is therefore apparent that I have provided a method indicating the position of the craft with reference to the line passing through the transmitter A and B that functions in the same manner, whether the craft is located on one side of the station A and B and is flying away from said stations as shown in Fig. 1, or whether the craft is located on the opposite side of the stations A and B and is flying towards said stations as shown in Fig. 7.

Consider now the position of the craft between the station A and B as shown in Fig. 8. Assume that the craft is flying from the station A towards the station B and occupies at a certain instant the position $22_{11}$ on the line AB. Assume also that the craft is equipped with a navigational instrument of the type shown in Fig. 2. Then when the direction finder is tuned to the station A, the loop 28 will be oriented in the direction $C_2A$ of the transmitter A and will cause the indicating pointer to show an angle $\alpha_2$, said angle being indicated in Fig. 8 as an angle between the longitudinal axis of the craft $C_2D_2$ and the direction $C_2A$ of the transmitter A. When the direction finder is tuned to the station B, then the loop 28 will assume an orientation opposite to the one referred to above, i. e., the new orientation of the loop 28 will be in the direction $C_2B$ of the transmitter B and will cause the indicating pointer to show the angle $\beta_2$, said angle $\beta_2$ being indicated in Fig. 8 as an angle between the longitudinal axis of the airplane $C_2D_2$ and the direction $C_2B$ of the transmitter B. It is apparent that the directions $C_2B$ and $C_2A$ differ one from another by 180 degrees and, consequently, when the direction finder is switched from the station A to the station B the loop 28 and the pointer is not any more stationary as shown in Fig. 3f. The loop and the pointer will tend to oscillate and will tend to assume alternately the orientations $C_2B$ and $C_2A$, said orientations being opposite one with respect to the other.

It is now apparent that a navigational instrument of the type of Fig. 2 is not suitable for the straight line navigation under the conditions of Fig. 8; i. e., when the craft is located between the stations A and B. The alternate tuning of the direction finder will cause violent oscillations of the loop 28 which will tend to assume alternately two opposite orientations and will introduce mechanical limitations into the design of the instruments, and among other things, will limit the frequency in accordance with which the alternate and recurrent tuning of the stations A and B may be effected.

In order to obviate the inconveniences referred to in the preceding paragraph I have provided a modified type of direction finder shown diagrammatically in Fig. 9 that is particularly adapted for straight line navigation purposes under the conditions of Fig. 8, i. e., when the craft is located between the stations A and B and is flying from the station A towards the station B. In this modified embodiment the loop of the direction finder and the pointer is made to be stationary during the alternate switching to the stations A and B when the craft occupies a position on the trajectory AB. I have also provided a modified type of direction finder shown in Fig. 10 in which the pointer is made to be stationary during the alternate switching. The embodiment shown in Fig. 9 should be used in connection with the direction finder of the station seeking type shown in Fig. 2 and the embodiment shown in Fig. 10 should be used in connection with the direction finder of the "homing type" shown in Fig. 4.

Consider now Fig. 9 representing a modification of the embodiment shown on Fig. 2 that is particularly adapted for navigational purposes under the conditions shown in Fig. 8, i. e., when the craft is located between the stations A and B.

The essential feature of the modification shown in Fig. 9 consists in the utilization of the switching mechanism 50 and 60. In the embodiment of Fig. 2 the only function of the switching mechanism consisted in alternately and repeatedly varying the tuning of the direction finder from the station A and to the station B and simultaneously producing a current representing such variation. In Fig. 9, however, the switching mechanism has also an additional function that consists in simultaneously varying the orientation of the loop antenna 28 so as to produce reversals of polarity of the output terminals 31, 32 of the loop antenna in synchronism with the variation of the tuning of the direction finder. As shown in Fig. 9 three switches are provided that are designated by numerals 50, 60 and 130 and that are actuated by a non-conductive rod 55 which in turn is given a reciprocating motion by a crank 56 driven by a motor 57.

It is apparent from the inspection of Fig. 2 and Fig. 9 that there are numerous elements identical to each other that are included in the navigational instruments represented in these figures. These elements have been designated by the same numerals in Fig. 2 and Fig. 9. Since the performance of these elements has already been described in connection with the instrument shown in Fig. 2, it is not deemed necessary to repeat their description in connection with the instrument shown in Fig. 9.

The switch 50 is arranged to connect either the tuning system $A_2$ or the tuning system $B_2$ into operation in the direction finder receiver. It consists of two stationary terminals 51 and 52 and of conductive arm 53 pivoted at a point 54 and adapted to rotate around the point 54. The other end of the bar 53 is linked by the non-conductive rod 55 and is given a reciprocating motion by alternately and repeatedly occupying two positions that correspond to tuning to the stations A and B, respectively.

The non-conductive rod also actuates the switch 60. The switch 60 consists of two stationary terminals 61 and 62 and of a conductive bar 63 pivoted at a point 64 and adapted to rotate around the point 64. The terminals 61 and 62 are connected one to another by means of a primary winding 65 of a transformer 66. A battery 67 is connected between the ground and the bar 63. The bar 63 is arranged to oscillate back and forth in synchronism with the bar 53 and is arranged to switch the battery 67 alternately to the terminal 61 and the terminal 62 of the transformer 66. The transformer 66 is arranged to generate across its output terminals 70 and 71 a voltage which is used as the reference phase. This voltage will follow the positional variations of the curve 17, Fig. 3a.

The non-conductive rod 55 also actuates the switch 130. The switch 130 consists of three stationary terminals 131, 132, 133 and of two conductive bars 134, 135 pivoted at points 136, 137 and adapted to rotate around said points. The terminals 131 and 133 are connected to the output terminal 31 of the loop 28 by means of a lead 138 and the terminal 132 is connected to the output terminal 32 of the loop 28 by means of the lead 139. The bars 134 and 135 are respectively connected by means of leads 140, 141 to the input of the radio receiver 41. In the illustration shown in the figure the bar 134 is in contact with the terminal 132 and the bar 135 is in contact with the terminal 133. Consequently, the output terminals 31, 32 of the loop antenna are indirectly connected to the input leads 141 and 140, respectively. The illustration shows also in dotted lines the alternate position of the bars 134, 135 at which the contact is established between said bars and the terminals 131 and 132, respectively. Consequently, in the alternate position the polarity of the output terminals 31, 32 of the loop antenna is reversed with respect to the input leads of the receiver 41, i. e., the output terminals 31, 32 of the loop antenna are directly connected to the input leads 140 and 141, respectively. The bars 134 and 135 are made to occupy alternately and repeatedly these two positions. Consequently, the polarity of the output terminals of the loop antenna 28 is alternately and repeatedly reversed with respect to the input leads 140, 141.

Consider now the performance of the direction finder of the type shown in Fig. 9 that provides alternate and recurrent tuning of the direction finder to the stations A and B and that simultaneously provides an alternate and recurrent phase reversal of the current derived from the loop 28, said phase reversal being effected with respect to the input leads 140, 141. The variation in the tuning and the phase reversal of the loop are synchronous one with respect to the other, and is effected by means of reciprocating motion of the rod 55 that controls simultaneously the switches 50, 60 and 130.

Assume that at a given instant the rod 55 is at the downward end of its travel and, consequently, the position of bars 53, 63, 134 and 135 is the one shown in Fig. 9. It is apparent that at this instant the direction finder is tuned to the station B and the output terminals 31, 32 of the loop antenna 28 are directly connected to the input terminals 141, 140, respectively, of the receiver 41. Assume also that the craft is located at the position $22_{11}$ as indicated on Fig. 8. Under such conditions, when the direction finder is tuned to the station B, the indicating pointer will be directed towards the station B and will show the angle $\beta_2$ between the longitudinal axis $C_2D_2$ of the craft and the direction $C_2B$ of the transmitter A. It is, however, apparent that after a suitable time interval the rod 55 reaches the upward end of its travel, and the position of the bars 53, 63, 134 and 135 becomes the one marked by dotted lines in Fig. 9. At this subsequent instant the direction finder is tuned to the station A and the output terminals 31, 32 of the loop antenna 28 are connected in reverse to the input leads of the receiver 41, i. e., the terminal 31 is connected to the lead 140 and the terminal 32 is connected to the lead 141. Under such conditions, when the direction finder is tuned to the station A the pointer 15 will not indicate the angle $\alpha_2$ between the longitudinal axis $C_2D_2$ and the direction $C_2A$. Because of the phase reversal of the output of the loop 28 that is simultaneous with the tuning into the station A, the pointer 15 will be directed away from the station A towards the point $A_2^1$ and will indicate the angle $(\alpha_2-180°)$ between the axis $C_2D_2$ and the opposite direction, i. e., the direction $C_2B$. It is apparent that $\beta_2=\alpha_2-180°$. Therefore, when the direction finder is being switched alternately and recurrently from the station B to the station A and when the phase of the output of the loop is being recurrently reversed, there will be no oscillation of the pointer 15 and its position is represented diagrammatically in Fig. 3f.

Assume now that the craft is located at a position indicated by the numeral $10_{11}$ and that the direction finder is tuned to the station B. Then the indicating point 15 of the direction finder will be directed towards the station B and will show an angle $\beta$, said angle being indicated in Fig. 8 as the angle between the longitudinal axis CD of the craft and the direction CB of the transmitter B. When, however, the direction finder is tuned to the station A, then the indicating pointer will not indicate the angle $\alpha$ between the longitudinal axis CD and the direction CA. Because of the phase reversal of the output of the loop 28 that is simultaneous with the tuning into the station A, the pointer will indicate now the angle $\alpha-180°$ said angle $\alpha-180°$ being indicated in Fig. 8 as the angle between the longitudinal axis CD of the craft and the direction $CA^1$, said direction $CA^1$ pointing away from the transmitter A. It is apparent that during the alternate and recurrent tuning of the direction finder in accordance with the line 17 of Fig. 3a, the pointer 15 will oscillate back and forth between two positions, the position pointing towards the station B, and the position pointing away from the station A. The frequency of these oscillations will be the same as that of the periodic switching process and the mean position that the pointer 15 will occupy during the oscillatory process represents the mean orientation CM as shown in Fig. 8.

It is apparent from the inspection of Fig. 8 that during said oscillatory process the angular velocity of the pointer 15 will alternate between positive and negative values. The angular displacement of the pointer with reference to the mean position CM will be positive when the pointer becomes oriented away from the station A. Furthermore, the angular displacement of the pointer with reference to the mean position CM will be negative when the pointer is oriented towards the station B. Therefore, the variation of the angular velocity of the pointer with respect to time is represented by Fig. 3d and this variation of the angular displacement with respect to time is represented by Fig. 3e. We may state, therefore, that the motion of the pointer 15 that corresponds to the alternate tuning of the direction finder will be the same when the craft occupies the position 20 in Fig. 1.

Assume now that the craft is located on the other side of the line AB at a position indicated by the numeral $20_{11}$ in Fig. 8. It is apparent that during the alternate and recurrent tuning of the direction finder in accordance with the line 17 of Fig. 3a, the pointer 15 will oscillate back and forth between two positions, the position indicating the angle $\beta_1$ when the pointer is directed towards the station B, and the position indicating the angle $\alpha_1 - 180°$ when the pointer is directed away from the station A towards the pointer $A_1^1$. The frequency of these oscillations will be the same as that of the periodic switching process and the mean position that the pointer 15 will occupy during the oscillatory process represents the mean orientation $C_1M_1$. The angular displacement of the pointer with reference to the mean position $C_1M_1$ will be positive when the pointer becomes oriented towards the station B and will be negative when it becomes oriented away from the station A. Therefore, the variation of the angular velocity of the pointer with respect to time is represented by Fig. 3b and the variation of the angular displacement with respect to time is represented by Fig. 3c. We may state, therefore, that the motion of the pointer 15 will be the same when the craft occupies the position 10 in Fig. 1.

The remaining elements of the modified instrument of Fig. 9 are the same as the corresponding elements of the instrument of Fig. 2 and have been designated by the same numerals. In particular, the modified instrument of Fig. 9 contains a balanced modulator 80 that receives two input voltages applied across the terminals 70, 71 and 73, 74, respectively, and produces across the output terminals 81, 82 a D. C. current the polarity of which represents the "in phase" or "out of phase" conditions of the two input voltages. The input voltage applied across the terminals 70, 71 represents the variation in tuning as illustrated in Fig. 3a, and the input voltage applied across the terminals 81, 82 represents the variation in the angular displacement of the pointer 15 or of the shaft 101. These variations in the angular displacement are represented by Fig. 3e when the craft occupies the position $10_{11}$, or by Fig. 3c when the craft occupies the position $20_{11}$, or by Fig. 3f when the craft occupies the position $22_{11}$. The output terminals 81, 82 of the balanced modulator 80 are applied to the indicator 25 provided with a movable pointer 26.

It is therefore apparent that when the craft is located between the stations A and B as shown in Fig. 8, the deflections of the pointer 26 of the indicator 25 are interpreted differently from those corresponding to the situations illustrated in Fig. 1 and Fig. 7. It has been noted that in Fig. 1 and Fig. 7 the deflection towards right of the indicator 25 corresponds to the position 10 and $10_1$ on the right side of the line AB (the "right side" being determined by an observer located in A and looking towards B). In the case of Fig. 8, however, the indicator 25 turns left when the craft is located at the position $10_{11}$ on the right side of the line AB. Similarly, while in Fig. 1 and Fig. 7 the deflection towards left of the indicator 25 corresponds to the position 20 and $20_1$ on the left side of the line AB, in Fig. 8 the indicator 25 turns right when the craft is located at the position $20_{11}$ on the left side of the line AB.

Consider now Fig. 10 representing a modification of the embodiment shown on Fig. 6 that is particularly adapted for navigation under the conditions shown in Fig. 8. The essential feature of the modification shown in Fig. 10 consists in utilization of a new type of switching mechanism. In Fig. 6 the only function of the switching mechanism consisted in alternately and repeatedly varying the tuning of the instrument from the station A to the station B and simultaneously producing a current representing such variation. In Fig. 10, however, the switching mechanism has also an additional function consisting in simultaneously varying the orientation of the loop antenna 300 so as to produce a reversal of polarity of the output terminals of the antenna in synchronism with the variation of tuning. As shown in Fig. 10, three switches are provided that are indicated by numerals 340, 350 and 160, respectively. The switch 340 is arranged so as to vary the tuning from the station A to the station B and its operation has been described in connection with Figure 6. The switch 350 is adapted to produce a current representing the variation in tuning of the instrument from the station A to the station B, and its operation has also been described in connection with Fig. 6. The switch 160 is the new element in the modified embodiment shown in Fig. 10 and it is arranged so as to change alternately and recurrently the polarity of the output terminals of the antenna 300 with respect to the input terminals of the rectifying unit 301 in accordance with the variation of the tuning from the station A to the station B. The switches 340, 160 and 350 are simultaneously actuated by the alternate motion of the rod 345 which is actuated by wheel 346 driven by motor 347.

As shown in Fig. 10, the switch 160 consists of three stationary terminals 161, 162 and 163 and of two conductive bars 164, 165 pivoted at points 166, and 167 and adapted to rotate around said points. The terminals 161, 163 are connected to the output terminal of the loop 300 by means of a lead 168 and the terminal 162 is connected to the other output terminal of the loop by means of the lead 169. The bars 164, 165 are respectively connected by means of the leads 170, 171 to the input of the rectifying unit 301. As illustrated in Fig. 10, the bar 164 is in contact with the terminal 162 and the bar 165 is in contact with terminal 163. Consequently, the output leads 168, 169 of the loop 300 are directly connected to the input leads 171, 170 of the rectifying unit 301. The illustration shows also in dotted lines alternate positions of the bars 164, 165 for connecting these bars with the terminals 161, 162, respectively. In this alternate position the polarity of the output leads 168, 169 of the loop antenna 300 is reversed with respect to the input leads 171, 170 of the rectifying unit 301. Namely, the output lead 168 of the loop antenna is connected to the input lead 170 of the rectifying unit 301 and the output lead 169 of the loop antenna is connected to the input lead 171 of the rectifying unit 301. The reciprocating motion of the rod 345 causes the bars 164, 165 to alternately and recurrently assume the positions indicated by solid lines and by dotted lines in Fig. 10. Consequently, the polarity of the output terminals 168, 169 of the loop antenna 300 is recurrently reversed with respect to the input leads 170, 171 in synchronism with the reciprocating motion of the rod 345.

The operation of the modified direction finder shown in Fig. 10 is analogous to the one shown in Fig. 9. Assume, for instance, that at a given instant the rod 345 is at the upward end of travel and, consequently, the position of the bars 343, 164 and 165, 353 is the one shown by means of solid lines in Fig. 10. It is apparent that in this instant the direction finder is tuned to the station B and the output leads 168, 169 of the loop antenna are directly connected to the input leads 171, 170, respectively, of the rectifying unit 301. It is now apparent that when the craft is located at either of the positions designated as 10₁₁, 20₁₁, 22₁₁ in Fig. 8, the deflection of the pointer in the indicator 304 of Fig. 10 will be in the same direction as the deflection of the pointer 15 in the indicator 14 of Fig. 9, or the voltage applied to the input terminals 373, 374 of the balanced modulator 380 of Fig. 10 will have the same polarity as the voltage applied to the input terminals 73, 74 of the balanced modulator 80 of Fig. 9.

It is, however, apparent that after a suitable time interval the rod 345 reaches the downward end of the travel and the position of the bars 343, 164, 165 and 353 is the one marked by the dotted lines in Figure 10. At this instant the direction finder is tuned to the station A and the output leads 168, 169 of the loop antenna are connected in reverse to the input leads 171, 170 of the rectifying unit 301. Under such conditions, when the craft is located at either of the positions designated as 10₁₁, 20₁₁, 22₁₁ in Fig. 8, the deflection of the pointer in the indicator 304 of Fig. 10 will be opposite to the one corresponding to the tuning to the station B and will be the same as the corresponding deflection of the pointer 15 in the indicator 14 of Fig. 9. Or, the voltage applied to the input terminals 373, 374 of the balanced modulator 380 of Fig. 10 will have a polarity that will be opposite to the one corresponding to the tuning to the station A and will be the same as the corresponding polarity of the voltage applied to the input terminals 73, 74 of the balanced modulator 80 of Fig. 9.

It is now apparent that when the direction finder of Fig. 10 has its tuning alternately and recurrently varied in a manner shown in Fig. 3a, the voltage applied across the input terminals 373, 374 will be in phase or out of phase with the variation of tuning and the relationship between the input voltage of the balanced modulator and the variation of tuning will be the same in Fig. 10 and Fig. 9 for either of the three positions indicated as 10₁₁, 20₁₁, and 22₁₁ of the craft. Consequently, the pointer 396 of the indicator 395 of Fig. 9 will give indications that are similar to those of the pointer 26 of the indicator 25 for various positions of the craft that are designated in Fig. 8 as 10₁₁, 20₁₁, and 22₁₁.

The systems illustrated in Figs. 2, 6, 9, and 10 provide the navigator with an indication informing him as to his position with reference to the trajectory 12 and enable him to restore his position on the trajectory in case of a deviation.

Fig. 11 illustrates an arrangement adapted to work in conjunction with either of the systems of Figs. 2, 6, 9, and 10 and to cause the airplane to be automatically steered so as to maintain its alignment with the trajectory 12. Such an automatic alignment may be effected, for instance, by connecting the instrument 25 of Fig. 2 to an automatic directional steering device, so that, when required, the instrument can influence the parts of the steering device which determines the chosen trajectory 12.

Referring now more particularly to Fig. 11 and to Fig. 2 the elements which are common to both figures are designated by the same numerals. In particular, in Fig. 11 the output terminals 81 and 82 of the block 80 are connected to the indicating instrument 25 and are also connected to a block 400 containing an amplifier. Consequently, across the output terminals of the block 400 we obtain an amplified voltage representing the position of the airplane with respect to the line 12 (see Fig. 1). The voltage derived from the output terminals of the block 400 is applied to the excitation winding 401 of a motor contained in the dotted rectangle 402. The rotor 403 of the motor 402 is energized by the battery 404 and is adapted to rotate the shaft 405 and thus to control the motion of the rudder 406 in response to the current flow through the excitation winding 401.

It is apparent that when the airplane is positioned on the line 12 the voltage across the output terminals 81 and 82 is zero. Consequently, the voltage derived from the output terminals of the block 400 is zero and no current is flowing through the excitation winding 401 of the motor 402. Therefore, the torque exerted by the motor 402 is zero and maintains the rudder at its normal position.

When, however, the airplane leaves its position on the line 12 and assumes a new position on the right hand side of the line 12 then a voltage of a certain polarity appears across the output terminals 81 and 82. This voltage is amplified in the block 400 and produces a current flowing through the excitation current flowing through the winding 401 of the motor 402. The direction of the excitation current flowing through the winding 401 is such as to cause the rotor 403 to exert a torque upon the shaft 405 and to turn the rudder 406 in such a direction as to restore the position of the airplane on the line 12. The motor 402 is of a reversible type. Consequently, when the airplane is returned to a position on the line 12, the excitation current of the motor decreases to zero and the torque exerted by the motor decreases to zero, then the motor reverses and rotates back to its original position and the rudder is allowed therefore to return to its normal position.

When the airplane leaves its position on the line 12 and assumes a new position on the left hand side of the line 12 then a voltage of a polarity which is opposite to the one referred to in the preceding paragraph appears across the output terminals 81 and 82. This voltage is amplified in the block 400 and causes a current to flow through the excitation winding 401 in a direction which is opposite to the one referred to in the preceding paragraph. This current causes the rotor 403 to exert a torque upon the shaft 405 and to turn the rudder 406 in an opposite direction to the one referred to in the preceding paragraph in order to resolve the position of the airplane on the line 12.

In the embodiment illustrated in Fig. 11 we have assumed that the block 400 contains an amplifier which produces across its output terminals an amplifier voltage similar to the voltage derived from the terminals 81 and 82. It is, however, apparent that I may further improve the operation of the device and to include in the block 402 various well known correcting factors depending upon the motion of the rudder.

It is, therefore, apparent that the direction of flight of the aircraft will be corrected in the event that the aircraft should tend to drift from the predetermined course because of the corrective movement imparted to the rudder.

I claim:

1. A system for producing an indication of the position of a craft relative to a line passing through two geographically separated radio transmitting stations, comprising directional radio receiving means aboard said craft and including non-quadrantial directional antenna means for picking up signals radiated from said two stations and provided with a control element enabling said means to receive separately signals radiated by either of said two stations, means for varying said control element whereby the output of said receiving means is varied in a predetermined manner depending upon the position of said craft relative to the line passing through said stations and independently of any quadrantial relationship between said craft and the respective stations, means for developing a variable electrical quantity having variations which are related in time to the variations of said control element, and means jointly responsive to the variations in the output of said receiving means and said variable electrical quantity for at all times producing a single variable indication identifying the position of said craft relative to the line passing through said stations.

2. Apparatus adapted to be installed aboard a craft to produce an indication of the position of the craft relative to a line passing through two geographically separated radio transmitting stations having different output frequencies, comprising directional radio receiving means, means for varying the tuning of said receiving means for the alternate reception of the signals radiated from said two stations, whereby the output of said receiving means is varied in a predetermined manner depending upon the position of said craft relative to the line passing through said stations, means responsive to said variations in the output of said receiving means for producing a voltage having periodic variations which are oppositely phased when said craft is located upon opposite sides of said line, and means operated in a definite relationship to the variation of said tuning for combining said voltages to produce a control voltage having a characteristic which changes in response to movement of said craft in opposite directions from a position on one side of said line or on the other side of said line.

3. Apparatus adapted to be installed aboard a craft to produce an indication of the position of the craft relative to a line positioned in a definite spacial relationship relative to two geographically separated radio transmitting stations, comprising radio receiving means provided with a control element enabling said means to receive separately signals radiated by either of said two stations, means for varying said control element for the alternate reception of the signals radiated from said two stations, whereby the output of said receiving means is varied in a predetermined manner depending upon the position of said craft relative to said line, means responsive to said variations in the output of said receiving means for producing a voltage having periodic variations which are oppositely phased when said craft is located upon opposite sides of said line, means for producing a reference voltage having periodic variations which are synchronized with the variations of said control element, and means controlled in accordance with the phase relationship between said voltages for producing an indication of the position of said craft relative to said line.

4. Apparatus adapted to be installed aboard a craft to product an indication of the position of the craft relative to a line positioned in a definite spacial relationship relative to two geographically separated radio transmitting stations having different output frequencies, comprising radio receiving means provided with a control element enabling said receiving means to receive signals radiated from one or the other of said stations, automatic switching means for controlling said control element alternately and recurrently to tune said receiving means for the alternate reception of the signals radiated from said two stations, whereby the output of said receiving means is varied in a predetermined manner depending upon the position of said craft relative to said line, means responsive to said variations in the output of said receiving means for producing a voltage having periodic variations which are oppositely phased when said craft is located upon opposite sides of said line, means for producing a reference voltage having periodic variations which are synchronized with the operation of said switching means, and means controlled in accordance with the phase relationship between said voltages for producing an indication of the position of said craft relative to said line.

5. A system for producing an indication of the position of a craft relative to a line positioned in a definite spacial relationship with respect to two geographically separated radio transmitting stations having different output frequencies, comprising a radio receiving means aboard said craft, two variable tuning systems individually and independently tunable to the output frequencies of said two stations, respectively, a switching means for alternately and recurrently inserting said tuning systems into said receiving means, whereby the output of said receiving means is varied in a predetermined manner depending upon the position of said craft relative to said line, means for developing a variable electrical quantity having variations which are related in time with the operation of said switching means, and means jointly responsive to the variations in the output of said receiving means and said variable electrical quantity for at all times producing a single variable indication identifying the position of said craft relative to the line passing through said stations.

6. A system for producing an indication of the position of a craft relative to a line passing through two geographically separated radio transmitting stations having different output frequencies, comprising a directional radio receiving means aboard said craft mounted in a definite geometrical relationship with respect to the longitudinal axis of said craft, two variable tuning systems individually and independently tunable to the output frequencies of said two stations, respectively, a switching means for alternately and recurrently inserting said tuning systems into said direction receiving means, thereby producing in the output of said receiving means signals representing the directions of said stations with respect to the longitudinal axis of said craft, means for developing a varying electrical quantity having variations which are synchronized with the operation of said switching means, and means jointly responsive to the variations in the output of said receiving means and said varying electrical quantity for producing an indication of the position of said craft relative to the line passing through said stations.

7. A system for producing an indication of the position of a craft relative to a line passing through two geographically separated radio transmitting stations having different output frequencies, comprising directional radio receiving means aboard said craft and including non-quadrantial directional antenna means for picking up signals radiated from said two stations, means for varying the tuning of said receiving means for the alternate reception of the signals radiated from said two stations, whereby the output of said receiving means is varied in a predetermined manner depending upon the position of said craft relative to the line passing through said stations and independently of any quadrantial relationship between said craft and the respective stations, means for developing a variable electrical quantity having variations which are related in time to the variations in the tuning of said receiving means, and means jointly responsive to the variations in the output of said receiving means and said variable electrical quantity for at all times producing a single variable indication identifying the position of said craft relative to the line passing through said stations.

8. A system for producing an indication of the position of a craft relative to a line passing through two geographically separated radio transmitting stations having different output frequencies, comprising directional radio receiving means aboard said craft and including non-quadrantial directional antenna means for picking up signals radiated from said two stations, means for periodically varying the tuning of said receiving means for the alternate reception of the signals radiated from said two stations, whereby the output of said receiving means is varied in a predetermined manner depending upon the position of said craft relative to the line passing through said stations and independently of any quadrantial relationship between said craft and the respective stations, means for developing a periodically varying electrical quantity having variations which are synchronized with the variations in the tuning of said receiving means, and means jointly responsive to the variations in the output of said receiving means and said periodically varying electrical quantity for producing an indication of the position of said craft relative to the line passing through said stations.

9. Apparatus adapted to be installed aboard a craft to produce an indication of the position of the craft relative to a line positioned in a definite spacial relationship relative to two geographically separated radio transmitting stations having different output frequencies, comprising radio receiving means, means for varying the tuning of said receiving means for the alternate reception of the signals radiated from said two stations, whereby the output of said receiving means is varied in a predetermined manner depending upon the position of said craft relative to said line, means responsive to said variations in the output of said receiving means for producing a voltage having periodic variations which are oppositely phased when said craft is located upon opposite sides of said line, means for producing a reference voltage having periodic variations which are synchronized with the variations in the tuning of said receiving means, and means controlled in accordance with the phase relationship between said voltages for producing an indication of the position of said craft relative to said line.

10. Apparatus adapted to be installed aboard a craft to produce an indication of the position of the craft relative to a line positioned in a definite spacial relationship relative to two geographically separated radio transmitting stations having different output frequencies, comprising radio receiving means, means for varying the tuning of said receiving means for the alternate reception of the signals radiated from said two stations, whereby the output of said receiving means is varied in a predetermined manner depending upon the position of said craft relative to said line, means responsive to said variations in the output of said receiving means for producing a voltage having periodic variations which are oppositely phased when said craft is located upon opposite sides of said line, means for producing a reference voltage having periodic variations which are synchronized with the variations in the tuning of said receiving means, and means controlled in accordance with the phase relationship between said voltages for producing a resultant voltage having a changing characteristic which changes with changes in the position of said craft relative to said line.

11. Apparatus adapted to be installed aboard a craft to produce an indication of the position of the craft relative to a line passing through two geographically separated radio transmitting stations having different output frequencies, comprising directional radio receiving means, means for varying the tuning of said receiving means for the alternate reception of the signals radiated from said two stations, whereby the output of said receiving means is varied in a predetermined manner depending upon the position of said craft relative to the line passing through said stations, means responsive to said variations in the output of said receiving means for producing a voltage having periodic variations which are oppositely phased when said craft is located upon opposite sides of said line, means for producing a reference voltage having periodic variations which are synchronized with the variations in the tuning of said receiving means, and means for combining said voltages to produce a direct control voltage having a polarity which reverses in response to movement of said craft from one side of said line to the other side of said line.

12. Apparatus adapted to be installed aboard a craft to produce an indication of the position of the craft relative to a line positioned in a definite spacial relationship relative to two geographically separated radio transmitting stations having different output frequencies, comprising radio receiving means provided with a tuning network for tuning said receiving means for the reception of signals radiated from one or the other of said stations and including tuning means, automatic switching means for controlling said tuning means alternately and recurrently to tune said receiving means for the alternate reception of the signals radiated from said two stations, whereby the output of said receiving means is varied in a predetermined manner depending upon the position of said craft relative to said line, means responsive to said variations in the output of said receiving means for producing a voltage having periodic variations which are oppositely phased when said craft is located upon opposite sides of said line, means for producing a reference voltage having periodic varations which are synchronized with the operation of said switching means, and means controlled in accordance with the phase relationship between said voltages for producing an indication of the position of said craft relative to said line.

13. Apparatus adapted to be installed aboard a craft to produce an indication of the position of the craft relative to a line positioned in a definite spacial relationship relative to two geographically separated radio transmitting stations having different output frequencies, comprising radio receiving means provided with a tuning network for tuning said receiving means for the reception of signals radiated from one or the other of said stations and including tuning means, automatic switching means for controlling said tuning means alternately and recurrently to tune said receiving means for the alternate reception of the signals radiated from said two stations, whereby the output of said receiving means is varied in a predetermined manner depending upon the position of said craft relative to said line, means responsive to said variations in the output of said receiving means for producing a voltage having periodic variations which are oppositely phased when said craft is located upon opposite sides of said line, means for producing a reference voltage having periodic variations which are synchronized with the operation of said switching means, and means for combining said voltages to produce a direct control voltage having a polarity which reverses in response to movement of said craft from one side of said line to the other side of said line.

14. The method of indicating aboard a moving craft the position of the craft relative to a line positioned in a definite spacial relationship relative to two geographically separated radio transmitting stations having different output frequencies, which comprises alternately and directionally receiving aboard said craft the signals radiated from said stations, generating aboard said craft a reference voltage having variations which are related in time to the alternations in the reception of said signals from said stations, converting the directionally received signals into a voltage having variations which are oppositely phased when said craft is located upon opposite sides of said line, and combining said voltages to produce a position indicating voltage which changes with variations in the phase relationship between the variations of said two first-named voltages to indicate the position of said craft relative to said line.

SERGE A. SCHERBATSKOY.

REFERENCES CITED

The following references are of record in the file of this patent:

UNITED STATES PATENTS

| Number | Name | Date |
| --- | --- | --- |
| 2,158,584 | Koster | May 16, 1939 |
| 2,199,402 | Hegenberger | May 7, 1940 |
| 2,247,029 | Luck | June 24, 1941 |
| 2,279,246 | Podliasky et al. | Apr. 7, 1942 |
| 2,361,956 | Moseley | Nov. 7, 1944 |
| 2,368,921 | Green | Feb. 6, 1945 |
| 2,379,363 | Lear | June 26, 1945 |